(12) United States Patent
Kodama et al.

(10) Patent No.: US 7,865,537 B2
(45) Date of Patent: Jan. 4, 2011

(54) FILE SHARING SYSTEM AND FILE SHARING METHOD

(75) Inventors: Shoji Kodama, Sagamihara (JP);
Kiyotake Kumazawa, Tokyo (JP);
Naoko Iwami, Sagamihara (JP); Tetsuya Uemura, Sayama (JP)

(73) Assignee: Hitachi, Ltd., Tokyo (JP)

( * ) Notice: Subject to any disclaimer, the term of this patent is extended or adjusted under 35 U.S.C. 154(b) by 416 days.

(21) Appl. No.: 12/068,216

(22) Filed: Feb. 4, 2008

(65) Prior Publication Data
US 2009/0125522 A1    May 14, 2009

(30) Foreign Application Priority Data
Oct. 31, 2007    (JP) .............................. 2007-283688

(51) Int. Cl.
*G06F 17/30* (2006.01)
(52) U.S. Cl. .................. 707/822; 707/825; 707/827
(58) Field of Classification Search ................ 707/822, 707/825, 827
See application file for complete search history.

(56) References Cited

U.S. PATENT DOCUMENTS

| | | | | |
|---|---|---|---|---|
| 4,104,718 | A * | 8/1978 | Poublan et al. ..................... 1/1 |
| 5,911,143 | A * | 6/1999 | Deinhart et al. .................... 1/1 |
| 6,763,442 | B2 * | 7/2004 | Arakawa et al. ............. 711/165 |
| 6,766,430 | B2 * | 7/2004 | Arakawa et al. ............. 711/165 |
| 7,065,342 | B1 * | 6/2006 | Rolf ........................ 455/412.1 |
| 7,260,696 | B2 * | 8/2007 | Arakawa et al. ............. 711/165 |
| 7,290,167 | B2 * | 10/2007 | Fujibayashi ..................... 714/6 |
| 7,313,579 | B2 * | 12/2007 | Murotani ............................ 1/1 |
| 7,451,217 | B2 * | 11/2008 | Wardrop ..................... 709/225 |
| 7,506,375 | B2 * | 3/2009 | Kanda et al. .................. 726/25 |
| 7,539,664 | B2 * | 5/2009 | Dutta et al. ........................ 1/1 |
| 7,606,358 | B2 * | 10/2009 | McGary et al. ......... 379/218.01 |
| 7,627,532 | B2 * | 12/2009 | Randle et al. ................. 705/65 |
| 2004/0236772 | A1 * | 11/2004 | Arakawa et al. ............ 707/100 |
| 2006/0020636 | A1 * | 1/2006 | Murotani ..................... 707/200 |
| 2007/0118575 | A1 * | 5/2007 | Kanda et al. ................ 707/204 |

OTHER PUBLICATIONS

"Amazon Simple Storage Service (Amazon S3)", Amazon Web Services, http://aws.mazon.com/s3, 7 pages.
Lisa Week, "Parallel NFS (pNFS)", Sun Microsystems, Inc., FROSUG—Sep. 26, 2006, pp. 1-22.

* cited by examiner

*Primary Examiner*—Jean M Corrielus
(74) *Attorney, Agent, or Firm*—Volpe and Koenig, P.C.

(57) ABSTRACT

Privacy information of a user is protected without hampering convenience when such user is to process a file in an online file storage. Provided is a file sharing system including at least one or more information processing units and a storage apparatus connected to the at least one or more information processing units via the Internet, and for storing files from the at least one or more information processing units in the storage apparatus and sharing the stored files with the at least one or more information processing units. The information processing unit includes a file creation unit for separating, when creating a file in the storage apparatus, privacy information that identifies a user creating the file from information required for creating the file in the storage apparatus, and creating the file in the storage apparatus by using information obtained by converting the separated privacy information.

15 Claims, 25 Drawing Sheets

FIG.4

| 160 | 161 | 162 | 163 | 164 |
| PERSONAL ACCOUNT NAME | PASSWORD | PASSWORD EXPIRATION DATE | AFFILIATED GROUP NAME |
|---|---|---|---|
| USER1 | PWA | 07/07/07 | Group1 |
| USER2 | PWB | 07/08/08 | Group2 |
| USER3 | PWC | 07/09/11 | Group3 |

FIG.5

| 170 | 171 | 172 | 173 | 174 | 175 |
| STORAGE IDENTIFIER | STORAGE ACCOUNT NAME | PASSWORD | PASSWORD EXPIRATION DATE | USED FILE COUNT |
|---|---|---|---|---|
| STR1 | ACNT1 | PW1 | 07/07/07 | 100 |
| STR1 | ACNT2 | PW2 | 07/08/08 | 90 |
| STR2 | ACNT3 | PW3 | 07/09/07 | 120 |
| STR2 | ACNT4 | PW4 | 07/10/07 | 80 |
| ⋮ | ⋮ | ⋮ | ⋮ | ⋮ |

FIG.6

| ENTRY NUMBER | PRIVACY INFORMATION ||||  MANAGEMENT INFORMATION FOR STORAGE ||||| SHARE MANAGEMENT INFORMATION |||
|---|---|---|---|---|---|---|---|---|---|---|---|---|
| | PERSONAL PATH NAME (1821) | PERSONAL ACCOUNT NAME (1822) | PERSONAL ACCESS AUTHORITY INFORMATION (1823) | PERSONAL TIME INFORMATION (OPTION) (1824) | STORAGE IDENTIFIER (1831) | STORAGE PATH NAME (1832) | STORAGE ACCOUNT NAME (1833) | STORAGE ACCESS AUTHORITY INFORMATION (1834) | ENCRYPTION KEY (1835) | SHARED FLAG (1841) | SHARED DIRECTORY DESTINATION ENTRY NUMBER (1842) | FILE TYPE (1843) |
| 001 | /DIR1/FILEA | USER1 | | | STR1 | /ABC/FILE_X | ACNT1 | | Key1 | ON | 003 | ORIG |
| 002 | /DIR1/FILEB | USER1 | | | STR1 | /DEF/FILE_Y | ACNT2 | | Key2 | OFF | N/A | ORIG |
| 003 | N/A | N/A | | | STR2 | /GHI/FILE_Z | ACNT3 | | Key3 | OFF | N/A | COPY |
| 004 | /DIR2/FILEC | USER2 | | | STR2 | /JKL/FILE_W | ACNT4 | | Key4 | OFF | N/A | ORIG |
| ... | ... | ... | ... | ... | ... | ... | ... | ... | ... | ... | ... | ... |

FIG.7

| ACCOUNT NAME | AUTHORITY INFORMATION |
|---|---|
| USER1 | Read/Write |
| USER2 | Read Only |
| USER3 | Read Only |

| CREATION TIME | 2007/7/10 10:10:10 | 1824A |
| ACCESS TIME | 2007/7/10 10:18:10 | 1824B |
| UPDATE TIME | 2007/7/10 10:12:10 | 1824C |

FIG.9

| TRIGGER TYPE | NEXT TRIGGER | TIME INTERVAL | |
|---|---|---|---|
| ACCESS HISTORY ANONYMIZATION TRIGGER | 2007/7/17 10:00 AM | RANDOM | ~194 |
| DUMMY FILE CREATION TRIGGER | 2007/7/18 9:00 AM | RANDOM | ~195 |
| PASSWORD CHANGE TRIGGER | 2007/7/19 10:00 PM | DAILY | ~196 |

| ACCOUNT NAME | PASSWORD | PASSWORD EXPIRATION DATE |
|---|---|---|
| ACNT1 | PW1 | 07/07/07 |
| ACNT2 | PW2 | 07/08/08 |
| ⋮ | ⋮ | ⋮ |

FIG.11

| STORAGE PATH NAME | STORAGE ACCOUNT NAME | STORAGE-SIDE ACCESS AUTHORITY INFORMATION | STORAGE-SIDE TIME INFORMATION | INODE INFORMATION | POINTER TO EXPLANATORY INFORMATION |
|---|---|---|---|---|---|
| /ABC/FILE_X | ACNT1 | | | | |
| /DEF/FILE_Y | ACNT2 | | | | |
| ⋮ | ⋮ | ⋮ | ⋮ | ⋮ | ⋮ |

| REQUEST FORMAT | INITIALIZATION | 132 |
|---|---|---|
| ONLINE FILE STORAGE LIST | STR1 STR2 STR3 | 133 |
| NUMBER OF STORAGE ACCOUNTS | 10 | 134 |

| REQUEST FORMAT | FILE CREATION | 142 |
|---|---|---|
| PERSONAL PATH NAME | /DIR1/FILE1 | 143 |
| PERSONAL ACCOUNT NAME | USER1 | 144 |
| DATA SIZE | 10KB | 145 |
| POINTER TO DATA | | 146 |

FIG.14

| REQUEST FORMAT | FILE CREATION | 501 |
|---|---|---|
| STORAGE PATH NAME | /ABC/FILE_X | 502 |
| STORAGE ACCOUNT NAME | ACNT1 | 503 |
| DATA SIZE | 10KB | 504 |
| DATA |  | 505 |

| REQUEST FORMAT | FILE REFERRAL | 511 |
|---|---|---|
| PERSONAL PATH NAME | /DIR1/FILE1 | 512 |
| PERSONAL ACCOUNT NAME | USER1 | 513 |

| REQUEST FORMAT | FILE REFERRAL | 521 |
|---|---|---|
| STORAGE PATH NAME | /ABC/FILE_X | 522 |
| STORAGE ACCOUNT NAME | ACNT1 | 523 |

| REQUEST FORMAT | FILE UPDATE | 531 |
|---|---|---|
| PERSONAL PATH NAME | /DIR1/FILE1 | 532 |
| PERSONAL ACCOUNT NAME | USER1 | 533 |
| OFFSET | 100 | 534 |
| SIZE | 10KB | 535 |
| POINTER TO DATA |  | 536 |

| REQUEST FORMAT | FILE UPDATE | 541 |
|---|---|---|
| STORAGE PATH NAME | /ABC/FILE_X | 542 |
| STORAGE ACCOUNT NAME | ACNT1 | 543 |
| OFFSET | 100 | 544 |
| SIZE | 10KB | 545 |
| DATA |  | 546 |

FIG.19

| REQUEST FORMAT | FILE DELETION | 551 |
|---|---|---|
| PERSONAL PATH NAME | /DIR1/FILE1 | 552 |
| PERSONAL ACCOUNT NAME | USER1 | 553 |

| REQUEST FORMAT | FILE DELETION | 561 |
|---|---|---|
| STORAGE PATH NAME | /ABC/FILE_X | 562 |
| STORAGE ACCOUNT NAME | ACNT1 | 563 |

| REQUEST FORMAT | FILE SHARE REQUEST | 571 |
|---|---|---|
| PERSONAL PATH NAME | N1 | 572 |
| PERSONAL ACCOUNT NAME | U1 | 573 |
| SHARED STORAGE IDENTIFIER | O2 | 574 |
| EXPLANATORY INFORMATION | D1 | 575 |

| REQUEST FORMAT | FILE SEARCH | 581 |
|---|---|---|
| PERSONAL ACCOUNT NAME | U3 | 582 |
| SEARCH KEYWORD | W1 | 583 |

| REQUEST FORMAT | ACCOUNT CREATION OR ACCOUNT DELETION OR PASSWORD CHANGE | ~591 |
|---|---|---|
| PERSONAL ACCOUNT NAME | USER1 | ~592 |
| NEW PASSWORD | PW1 | ~593 |
| STORAGE ACCOUNT LINK | REQUIRED | ~594 |

| ENTRY NUMBER | PRIVACY INFORMATION ||||  SUBFILE CONFIGURATION INFORMATION ||| MANAGEMENT INFORMATION FOR STORAGE ||||| SHARE MANAGEMENT INFORMATION |||
|---|---|---|---|---|---|---|---|---|---|---|---|---|---|---|---|
| | PERSONAL PATH NAME | PERSONAL ACCOUNT NAME | PERSONAL ACCESS AUTHORITY INFORMATION | PERSONAL TIME INFORMATION (OPTION) | OFFSET | SIZE | NEXT ENTRY | STORAGE IDENTIFIER | STORAGE PATH NAME | STORAGE ACCOUNT NAME | STORAGE ACCESS AUTHORITY INFORMATION | ENCRYPTION KEY | SHARED FLAG | SHARED DIRECTORY DESTINATION ENTRY NUMBER | FILE TYPE |
| 001 | /DIR1/FILEA | USER1 | | | 0 | 100 | 002 | STR1 | /ABC/FILE_L | ACNT1 | | Key1 | OFF | N/A | ORIG |
| 002 | /DIR1/FILEB | USER1 | | | 100 | 150 | 003 | STR2 | /DEF/FILE_M | ACNT2 | | Key2 | OFF | N/A | ORIG |
| 003 | /DIR1/FILEB | USER1 | | | 250 | 50 | N/A | STR3 | /GHI/FILE_N | ACNT3 | | Key3 | OFF | N/A | ORIG |
| ... | ... | ... | ... | ... | | | | | | | | ... | ... | ... | ... |

FILE SHARING SYSTEM AND FILE SHARING METHOD

CROSS REFERENCES

This application relates to and claims priority from Japanese Patent Application No. 2007-283688, filed on Oct. 31, 2007, the entire disclosure of which is incorporated herein by reference.

BACKGROUND

The present invention relates to a file sharing system and a file sharing method, and, for instance, can be suitably applied to a file sharing system and a file sharing method that protects the privacy of users using files stored in an online file storage, which is accessed by an unspecified number of information processing units, upon sharing such files with third parties.

A user is able to store files in one's PC (Personal Computer) in an online file storage or file server as represented by "Amazon (registered trademark) S3 (Simple Storage Service)" via the Internet. With these network-connected storage apparatuses, NFS (Network File System), HTTP (Hyper Text Transfer Protocol), or the like is used upon storing files in the online file storage.

With NFS and HTTP, the storage apparatus-side possesses the file system function, and the file system centrally controls the account information database, the file path name, and the physical layout of files in the disk drive.

The online file storage authenticates a client by verifying the account name and password designated by the client with the account information database. The online file storage manages the access authority information per file, and prevents unauthorized access by only permitting the account possessing access authority to access the relevant file.

A file is provided with a path name for uniquely identifying the files in the online file storage. The path name is configured from a hierarchy of a directory storing the file and the file name. Although an arbitrary character string can be used as the hierarchy of directory and the file name, under normal conditions a unique name or numbers are used so that the file creator will be able to understand the contents of the file. The path name of the file is being managed by the online file storage storing such file (for instance, refer to http://aws.amazon (registered trademark).com/s3).

There is also technology known as "CleverSafe (registered trademark)" or "pNFS" that enables the use of a plurality of online file storages connected to a network as a single virtual storage apparatus. This technology is configured from an online file storage storing files, a client that accesses the files, and a metadata server for managing the location of the files.

The metadata server authenticates a client by verifying the account name and password designated by the client with the account information database. The online file storage also authenticates a client by verifying the account name and password designated by the client with the account information database. In the case of "CleverSafe," a single account information database is used among the metadata server, the online file storage, and the client. The user or application only needs to log on one time to the client, and does not need to remember the account information for each metadata server or plurality of online file storages. Upon creating a file, the client designates the path name of the file to be created and issues a file creation request to the metadata server. Meanwhile, the metadata server determines the position; that is, in which online file storage the file is to be stored, and returns such position information to the client. The client stores the file in the designated online file storage. The path name of the file is managed by the metadata server. A plurality of metadata servers may exist, and may respectively possess an independent name space.

SUMMARY

Nevertheless, since the conventional technology pursued the convenience in the use and sharing of files, it had disadvantages in the protection of privacy information of individuals. In particular, since online file storage is not a very reliable service, the popularization of the foregoing service is being delayed since users are reluctant to use said service in fear that their privacy information will be leaked.

For instance, in the case of services such as "Amazon (registered trademark)," upon storing files in the online file storage, information capable of specifying an individual is stored as information incidental to the files. This is called privacy information. As examples of privacy information, there are the owner name of the file, group name to which the owner belongs, path name of the, file type, access time to the file, access authority information of the file, and so on.

The problems concerning privacy upon managing the account name on the online file storage-side are now explained. Since the online file storage-side is able to list all files created with that account, as a result of associating and analyzing the account name, path name of the file and access history, it will be possible to identify the user who opened that account and specify the activities of such user. Thus, there was a problem in that the privacy of users cannot be protected.

Although the use of a random character string for the path name of the file can be considered as a solution for making the identification of individuals difficult, in the case of a random character string, there is a problem in that the contents of the file cannot be guessed from the file name, thereby inconveniencing the user. In addition, since the account name information owning the file per file is being managed by the online file storage-side, it will be possible to identify the user or specify the user's actions by analyzing which account accessed which file.

When using architecture such as "CleverSafe," since the metadata server manages the path name of the file, the path name of the file cannot be obtained by referring to the information incidental to the file only from the online file storage-side. Thus, it will be difficult to identify the user. Since the user is able to access the file using the path name, the user's convenience will not be hampered.

Nevertheless, since account information is shared among the metadata server, the online file storage, and the client, the online file storage-side will be able to collect the access history information regarding which account user accessed which file. Thus, there is a problem in that it will be possible to identify the user or specify the user's actions by analyzing such information.

The present invention was made in view of the foregoing points. Thus, an object of the present invention is to propose a file sharing system and a file sharing method for protecting the privacy information of users without hampering convenience when the user is to process files in the online file storage.

Another object of the present invention is to propose a file sharing system and a file sharing method for sharing data among a plurality of users via the online file storage while protecting the privacy information of users.

In order to achieve the foregoing objects, the present invention provides a file sharing system including at least one or more information processing units and a storage apparatus connected to the at least one or more information processing units via the Internet, and for storing files from the at least one or more information processing units in the storage apparatus and sharing the stored files with the at least one or more information processing units. The information processing unit comprises a file creation unit for separating, when creating a file in the storage apparatus, privacy information that identifies a user creating the file from information required for creating the file in the storage apparatus, and creating the file in the storage apparatus by using information obtained by converting the separated privacy information.

The present invention additionally provides a file sharing system including at least one or more information processing units and a storage apparatus connected to the at least one or more information processing units via the Internet, and for storing files from the at least one or more information processing units in the storage apparatus and sharing the stored files with the at least one or more information processing units. The information processing unit comprises a management table for at least managing privacy information containing a first account and a first path that identify a user creating a file, and storage management information containing a second account that is different from the first account and a second path that is different from the first path, a registration unit for creating the second account and the second path from the first account and the first path upon creating a new file in the storage apparatus, and associating and registering the first account and the first path in the management table, and a file creation unit for creating the new file in the storage apparatus by using second account and the second path registered in the management table.

According to the present invention, it is possible to propose a file sharing system and a file sharing method for protecting the privacy information of users without hampering convenience when the user is to process files in the online file storage.

According to the present invention, it is also possible to propose a file sharing system and a file sharing method for sharing data among a plurality of users via the online file storage while protecting the privacy information of users.

DESCRIPTION OF DRAWINGS

FIG. 4 is a diagram showing an example of a personal account management table according to the first embodiment;

FIG. 5 is a diagram showing an example of a storage management table according to the first embodiment;

FIG. 6 is a diagram showing an example of a file management table according to the first embodiment;

FIG. 7 is a diagram showing an example regarding the type of information contained in a personal access authority information column according to the first embodiment;

FIG. 8 is a diagram showing an example regarding the type of information contained in a personal time information column according to the first embodiment;

FIG. 9 is a diagram showing an example of an anonymization trigger table according to the first embodiment;

FIG. 10 is a diagram showing an example of a storage account management table according to the first embodiment;

FIG. 11 is a diagram showing an example of a file system management information table according to the first embodiment;

FIG. 12 is a diagram showing an example of initialization request information according to the first embodiment;

FIG. 13 is a diagram showing an example of a request format when requesting file creation to the personal file management system according to the first embodiment;

FIG. 14 is a diagram showing an example of a request format when requesting file creation to the online file storage according to the first embodiment;

FIG. 15 is a diagram showing an example of a request format when requesting file referral to the personal file management system according to the first embodiment;

FIG. 16 is a diagram showing an example of a request format when requesting file referral to the online file storage according to the first embodiment;

FIG. 17 is a diagram showing an example of a request format when requesting file update to the personal file management system according to the first embodiment;

FIG. 18 is a diagram showing an example of a request format when requesting file update to the online file storage according to the first embodiment;

FIG. 19 is a diagram showing an example of a request format when requesting file deletion to the personal file management system according to the first embodiment;

FIG. 20 is a diagram showing an example of a request format when requesting file deletion to the online file storage according to the first embodiment;

FIG. 22 is a diagram showing an example of a request format when requesting file sharing to the personal file management system according to the first embodiment;

FIG. 23 is a diagram showing an example of a request format when requesting file search to the personal file management system according to the first embodiment;

FIG. 36 is a diagram showing a file management table according to the second embodiment.

DETAILED DESCRIPTION

The respective embodiments of the present invention are now explained with reference to the attached drawings.

First Embodiment

Figure 1:
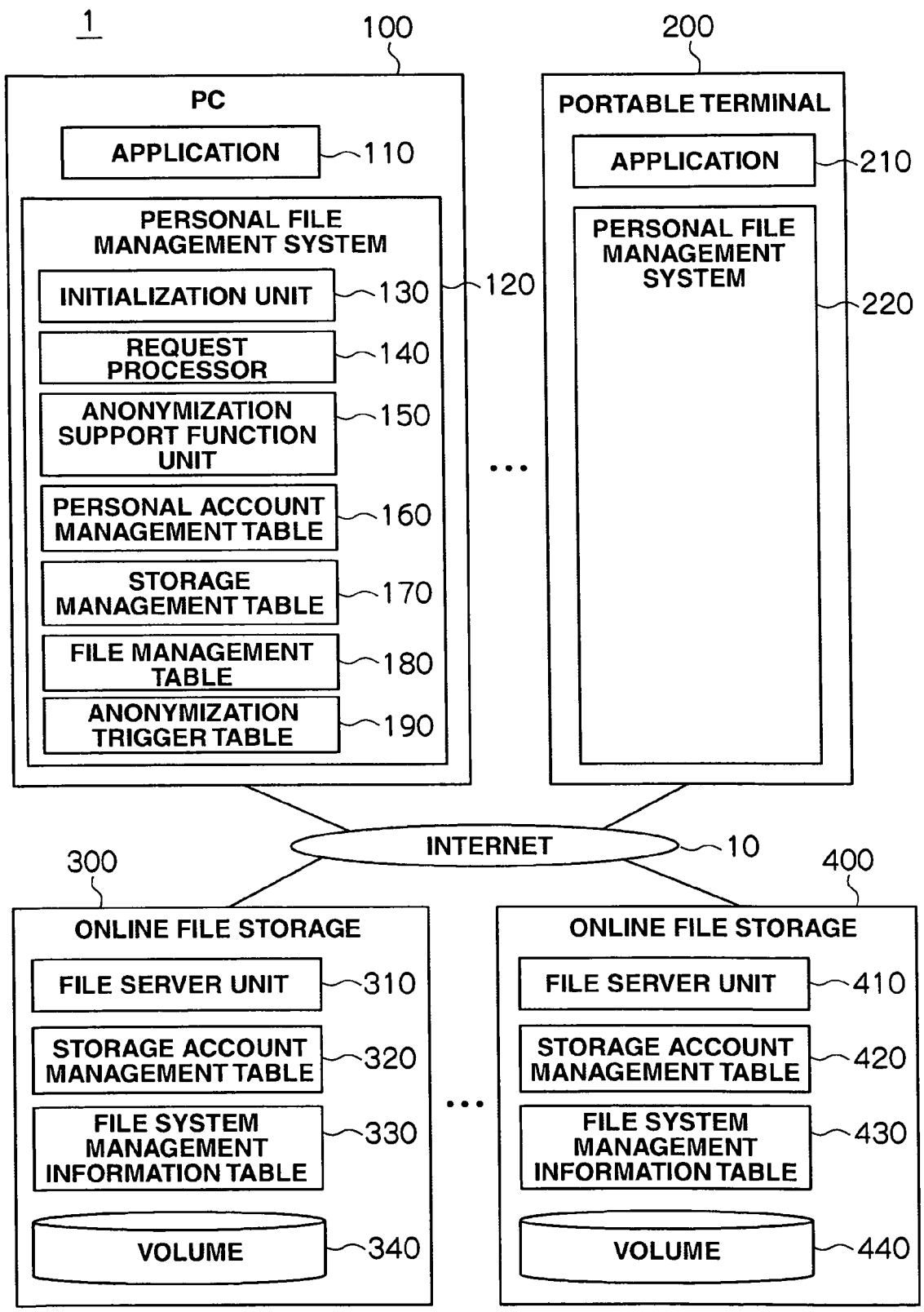
FIG. 1 is a diagram showing the configuration of a privacy protection file sharing system according to the first embodiment of the present invention.

The first embodiment is foremost explained. FIG. 1 is a diagram showing the configuration of a privacy protection file sharing system. As shown in FIG. 1, the privacy protection file sharing system 1 comprises a PC (Personal Computer) 100, a portable terminal 200, and online file storages 300 and 400. The PC 100, the portable terminal 200, and the online file storages 300 and 400 are connected via the Internet 10. The PC 100, the portable terminal 200, and the online file storages 300, 400 contained in the privacy protection file sharing system 1 are not limited to the example shown in FIG. 1, and it would suffice so as long as there are at least one or more PCs or portable terminals, and one or more online file storages.

In addition, although the privacy protection file sharing system 1 shown in FIG. 1 adopts a configuration that uses the online file storages 300, 400 connected to the Internet 10 as the storage apparatus for storing files, the privacy protection file sharing system, for instance, may also be applied to a local environment in a data center. When applying the privacy protection file sharing system 1 in this kind of local environment, a file server, a NAS (Network Attached Storage) or the like may be used in substitute for the online file storage. The Ethernet (registered trademark) may also be used to connect the PC and the file server.

The PC 100 includes an application 110, and a personal file management system 120. The application 110 is a controller for realizing applications that perform various operations, and creates files in the online file storage 300 or 400 via the personal file management system 120, and refers to and updates the created files. The personal file management system 120 performs processing for protecting privacy information from the online file storages 300, 400 by separating management information (hereinafter referred to as "privacy information") capable of identifying the individual user using the application among the management information required for managing the file, and managing the privacy information in the personal file management system 120. Details concerning this processing will be described later.

The personal file management system 120 has an initialization unit 130, a request processor 140, an anonymization support function unit 150, a personal account management table 160, a storage management table 170, a file management table 180, and an anonymization trigger table 190. The initialization unit 130 is a processor to be executed when a user issues a request to the personal file management system 120 for newly creating a file system. The request processor 140 is a processor for processing requests from the application 110 such as file creation, referral, update and deletion, file search, file sharing, and account management. The anonymization support function unit 150 is a processor for performing processing that maintains anonymity concerning the access history by accessing the files or creating random files in the online file storages 300, 400 irrelevant to the file access request from the application 110, and prevents the cracking of passwords by periodically changing the password of the storage account. Details concerning the processing contents of the initialization unit 130, the request processor 140, and the anonymization support function unit 150, and the contents stored in the personal account management table 160, the storage management table 170, the file management table 180, and the anonymization trigger table 190 will be described later.

The portable terminal 200, for example, is a PDA (Personal Digital Assistant). The portable terminal 200 has an application 210, and a personal file management system 220. The detailed explanation of these components is omitted since the explanation will be the same as the case of the PC 100 even though the reference numerals are different. In FIG. 1, the illustration of the respective processors and tables in the personal file management system 220 is omitted.

The online file storage 300 is a storage for storing files from the PC 100, and the portable terminal 200. The online file storage 300 has a file server unit 310, a storage account management table 320, a file system management information table 330, and a volume 340. The file server unit 310 executes processing for realizing the functions as a file server. The contents stored in the storage account management table 320 and the file system management information table 330 will be described later. The volume 340 is configured from a plurality of physical disks. Explanation of the online file storage 400 is omitted since it is configured the same as the online file storage 300 even though the reference numeral is different.

Figure 2:
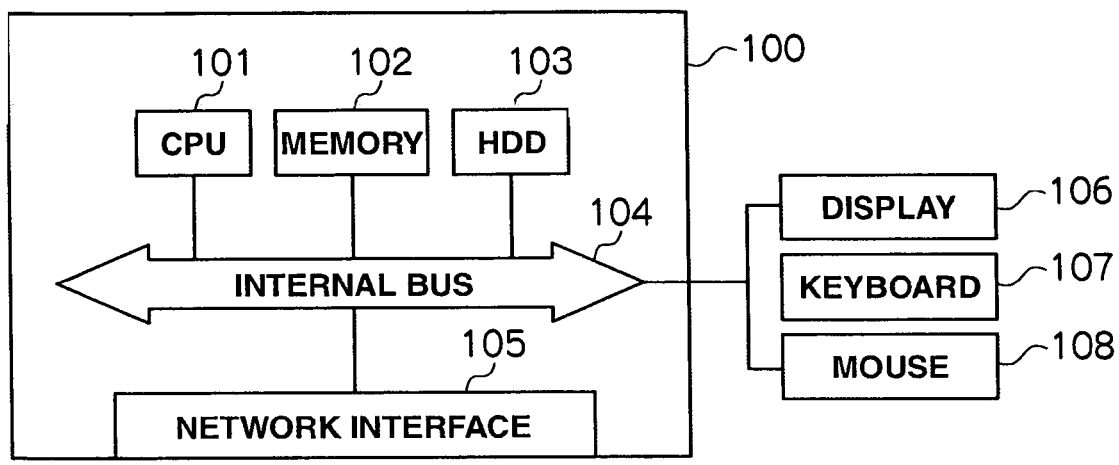
FIG. 2 is a diagram showing the physical configuration of a PC according to the first embodiment.

FIG. 2 is a diagram showing the physical configuration of the PC 100. The PC 100 includes a CPU (Central Processing Unit) 101, a memory 102, an HDD (Hard Disk Drive), and a network interface 105 as its constituent elements, and these components are connected via an internal bus 104. The internal bus 104 is also connected to a display 106, a keyboard 107, and a mouse 108.

The CPU 101 executes the various programs stored in the memory 102 and realizes the various types of processing such as the processing to be performed by the initialization unit 130 in the application 110 and the personal file management system 120, processing of the request processor 140, and processing of the anonymization support function unit 150. The memory 102 stores the various programs to be executed by the CPU 101, and also retains the personal account management table 160, the storage management table 170, the file management table 180, and the anonymization trigger table 190. The network interface 105 controls the communication with the online file storages 300, 400 via the Internet 10. The display 106 displays necessary information to the user for the user conduct operations using the PC 100. The keyboard 107 and the mouse 108 are used inputting commands to the PC 100 when the user conducts various operations with the PC 100.

Figure 3:
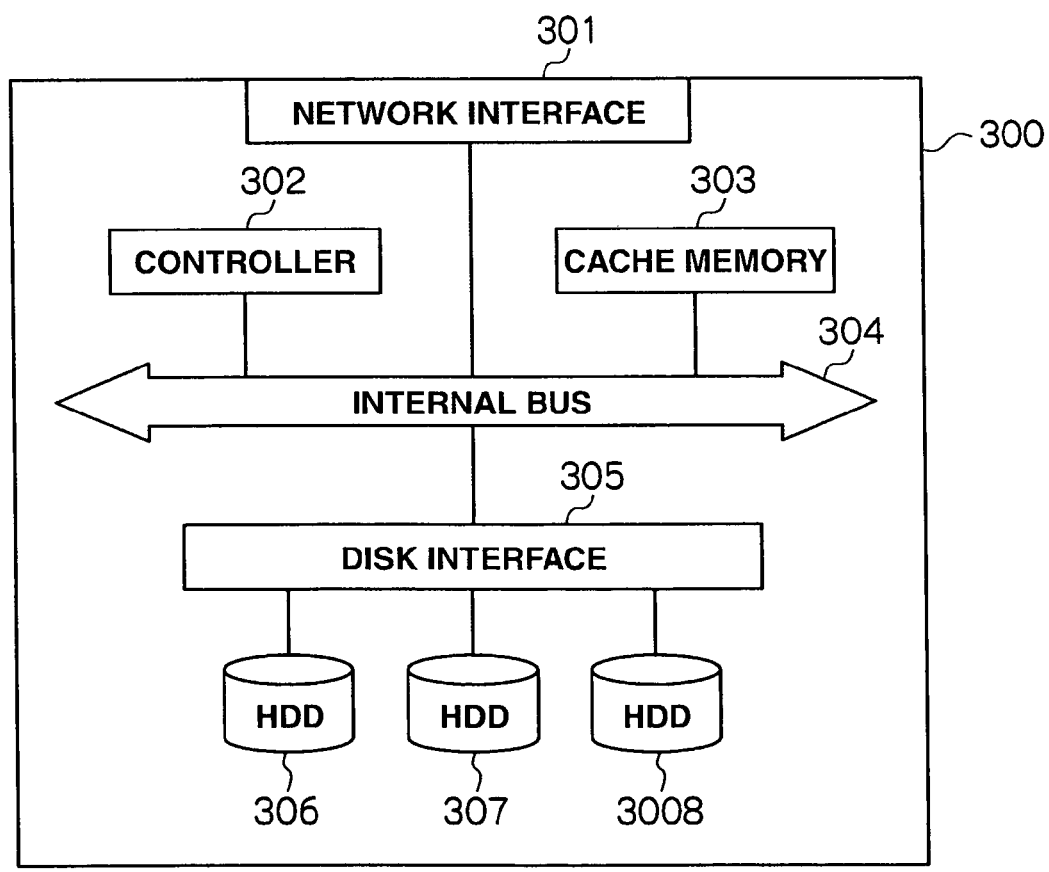
FIG. 3 is a diagram showing the physical configuration of an online file storage according to the first embodiment.

FIG. 3 is a diagram showing the physical configuration of the online file storage 300. The online file storage 300 has a network interface 301, a controller 302, a cache memory 303, an internal bus 304, a disk interface 305, and hard disk drives 306 to 308.

The network interface 301 controls the communication with the PC 100 and the portable terminal 200 via the Internet 10. The controller 302 has a built-in memory and the like, and executes the processing of the file server unit 310 by executing the programs stored in the memory. The cache memory 303 temporarily stores the sent and received data via the network interface 301. The internal bus 304 connects the network interface 301, the controller 302, the cache memory 303, and the disk interface 305. The disk interface 305 controls the writing of data into the hard disk drives 306 to 308 and the reading of data from the hard disk drives 306 to 308. The hard disk drives 306 to 308 configure the volume 340 and also store various files.

The personal account management table 160, the storage management table 170 and the file management table 180 stored in the personal file management system 120 of the PC 100 are now explained with reference to FIG. 4 to FIG. 8.

FIG. 4 is a diagram showing an example of the personal account management table 160. The personal account management table 160 is a table for managing the account name and password to be used by the personal file management system 120 for authenticating the user. There is one personal account management table 160 for each personal file management system 120.

The personal account management table 160 has a personal account name column 161, a password column 162, a password expiration date column 163, and an affiliated group name column 164. The personal account name column 161 is a column for storing an account name for uniquely identifying the user in the personal file management system 120 managing the personal account table 160. The password column 162 is a column for storing the password corresponding to the account name. A password is used for authenticating the valid user when the passwords coincide. The password expiration date column 163 is a column for storing the expiration date of the password. The affiliated group name column 164 is a column for storing the group name to which the account belongs. The group name is unique information in the personal file management system 120.

The personal account management table 160, for instance, stores "USER1" in the personal account name column 161, "PWA" in the password column 162, "07/07/07" in the password expiration date column 163, and "Group1" in the affiliated group name column 164.

FIG. 5 is a diagram showing an example of the storage management table 170. The storage management table 170 is a table for managing the online file storage group in which the personal file management system 120 is storing the files, and the online file storage-side account information that is available upon storing the files. Since a plurality of accounts are available to a single online file storage, entries in tables in the same number as the accounts exist. The storage management table 170 has a storage identifier column 171, a storage account name column 172, a password column 173, a password expiration date column 174, and a used file count column 175.

The storage identifier column 171 is a column for storing the storage identifier that is used for uniquely identifying the online file storage. For example, the IP (Internet Protocol) address or URL (Uniform Resource Locator) of the online file storage is used. The storage account name column 172 is a column for storing the account name that is being managed by the online file storage. The account name stored in the storage account column 172 is different from the personal account name managed by the personal file management system 120. The password column 173 is a column for storing the password corresponding to the storage account. This password is used by the online file storage upon authenticating the account. The password expiration date column 174 is a column for storing the expiration date of the password. The used file count column 175 is a column for storing the used files owned by the account in the online file storage. When a single personal account is using a plurality of storage accounts, the storage account to be used during file creation is determined so that the number of files owned by each storage account will be equal so that an individual will not be identified as a result of the number of files created among the storage accounts becoming biased.

The storage management table 170, for example, stores "STR1" in the storage identifier column 171, "ACNT1" in the storage account name column 172, "PW1" in the password column 173, "07/07/07" in the password expiration date column 174, and "100" in the used file count column 175.

FIG. 6 is a diagram showing an example of the file management table 180. The file management table 180 has an entry number column 181, a privacy information column 182, a storage management information column 183, and a share management information column 184. Information that is managed by the file management table 180 can be broadly classified into three types of information according to the objective; namely, privacy information, storage management information, and share management information.

The entry number stored in the entry number column 181 is a unique identifier allocated to the individual files being managed by the personal file management system 120. The privacy information stored in the privacy information column 182 is information concerning privacy among the management information of files. The storage management information stored in the storage management information column 183 manages in which online file storage the file was stored. The share management information stored in the share management information column 184 is used for managing the information required for file sharing. The privacy information, the storage management information and the share management information are now explained in detail.

The privacy information is foremost explained. The privacy information column 182 storing the privacy information has a personal path name column 1821, a personal account name column 182, a personal access authority information column 1823, and a personal time information column 1824.

The personal path name column 1821 stores a personal path name which is information for identifying a file with a name space of such space managed by the personal file management system 120, and configured from a directory hierarchy and a file name. The personal account name column 182 stores a personal account name shows the owner of the file.

The personal access authority information column 1823 stores personal access authority information showing the access authority of the file for each account when a plurality of accounts access the file in the personal file management system 120. The personal access authority information column 1823, as shown in FIG. 7, has an account name column 1823A and an authority information column 1823B. Information showing whether there is referral authority or update authority of the file for each account name stored in the account name column 1823A is stored in the authority information column 1823B. The authority information column 1823B, for instance, as shown in FIG. 7, stores "read/write," "read only" and the like. "Read/write" shows that there is referral/update authority, and "read only" shows that there is only referral authority.

The personal time information column 1824 stores personal time information such as the time the file was created or updated. The personal time information column 1824, as shown in FIG. 8, has a creation time column 1824A, an access time column 1824B and an update time column 1824C. The creation time column 1824A is a column for storing the time that the file was created. The access time column 1824B is a column for storing the time that the created file was last accessed. The update time column 1824C is a column for storing the time that the created file was updated.

Incidentally, when it is not necessary to manage the personal time information as privacy information such as when there in only one online file storage on the Internet 10, without managing the personal time information with the file management table 180, the online file storage may use the time information managed per file. Nevertheless, if there are a plurality of online file storages and it is difficult to match the time among the online file storages such as when the timezone is different or the time is varied per online file storage, time information per file is managed in the file management table 180 of the personal file management system 120.

The storage management information is now explained. The storage management information column 183 storing the storage management information has a storage identifier column 1831, a storage path name column 1832, a storage account name column 1833, a storage access authority information column 1834, and an encryption key column 1835.

The storage identifier column 1831 stores a storage identifier of the online file storage storing the files. The storage path name column 1832 stores a storage path name for identifying a file with the name space of such file managed by the online file storage upon storing the file in the online file storage. This information is configured from a directory hierarchy and a file name. For online file storages that use an ID instead of a path name for storing files, an ID is used. The storage account name column 1833 stores an account name to be used upon storing the file in the online file storage. The account name corresponds to the creator of the file in the online file storage. The storage access authority information column 1834 stores the access authority information concerning each stored file. The personal file management system 120 determines which storage account is accessible to the file during file sharing, and sets such access authority information in the online file storage. The storage access authority information is managed for the purpose of storing the setting information in the personal file management system 120. Thus, this information is not required if it is not necessary to store the information. The encryption key column 1835 stores an encryption key to be used upon encrypting the file and storing such file in the online file storage.

The share management information is now explained. The share management information column 184 storing the share management information has a share flag column 1841, a share destination entry number column 1842, and a file type column 1843.

The share flag column 1841 stores a share flag showing whether the file is currently being shared. For instance, if the share flag is "ON" this shows that the file is being shared, and if the share flag is "OFF" this shows that the file is not being shared. The share destination entry number column 1842 stores an entry number in the file management table 180 that manages the copy of the original file. In this embodiment, when sharing the file, the copy of the original file is created with an account that is different from the account during the original file creation in an online file storage that is different from the online file storage storing the original file. Information concerning the owner of the original file is hidden and privacy is protected by teaching the location of the copied file to others. The file type column 1843 stores the file type showing the difference whether it is an original file or a copied file. As the file type, for instance, "ORIG" or "COPY" is stored. When "ORIG" is stored, this shows that the file is an original file. When "COPY" is stored, this shows that the file is a copied file. When the file is a copied file, since the privacy information in the file management table 180 will be shared with the information of the original file, the contents in the entry will be invalid (N/A).

The file management table 180, for instance, as shown in FIG. 6 to FIG. 8, stores "001" in the entry number column 181, "/DIR1/FILEA" in the personal path name column 1821, "USER1" in the personal account name column 1822, "USER1: Read/Write" in the personal access authority information column 1823, "2007/07/07" in the personal time information column 1824, "STR1" in the storage identifier column 1831, "/ABC/FILE_X" in the storage path name column 1832, "ACN1" in the storage account name column, "No Data" in the storage access authority information column 1834, "Key1" in the encryption key column 18353, "ON" in the share flag column 1841, "003" in the share destination entry number column 1842, and "ORIG" in the file type column 1843.

FIG. 9 is a diagram showing an example of the anonymization trigger table 190. The anonymization trigger table 190 is a table that sets the trigger for executing the anonymization support function unit 150. The anonymization trigger table 190 has a trigger type column 191, a next trigger column 192, and a time interval column 193. The trigger type column 191 stores the type of trigger that will execute the anonymization support function unit 150. As the trigger type, there are an access history anonymization trigger column 194, a dummy file creation trigger column 195, and a password change trigger column 196. The access history anonymization trigger column 194, the dummy file creation trigger column 195, and the password change trigger column 196 are respectively set with a trigger for anonymizing the access history, a trigger for creating a dummy file, and a trigger for changing the password. As a result of anonymizing the access history, creating a dummy file and changing the password based on the trigger set in the anonymization trigger table 190, it is possible to perform processing for increasing the anonymity in the privacy protection file sharing system 1. The next trigger column 192 stores the next time that the anonymization processing is to be performed for each trigger type. The time interval column 193 shows the frequency of anonymization processing. When the time interval is random, the anonymization trigger is decided randomly. When the time interval is daily, anonymization processing is performed once a day.

The anonymization trigger table 190, for instance, as shown in FIG. 9, stores "access history anonymization trigger" in the trigger type column 191, "2007/7/17 10:00 AM" in the next trigger column 192, and "random" in the time interval column 193.

The storage account management table 320 and the file system management information table 330 stored in the online file storage 300 are now explained.

FIG. 10 is a diagram showing an example of the storage account management table 320. The storage account management table 320 has an account name column 321, a password column 322, and a password expiration date column 323. The contents stored in the account name column 321, the password column 322, and the password expiration date column 323 are the same as the contents stored in the personal account management table 160, and the detailed explanation thereof is omitted.

FIG. 11 is a diagram showing an example of the file system management information table 330. The file system management information table 330 includes management information required upon storing files in the volume 340, and explanatory information explained regarding the file contents to be used upon searching for files.

The file system management information table 330 has a storage path name column 331, a storage account name column 332, a storage-side access authority information column 333, a storage-side time information column 334, an inode information column 335, and a pointer to the explanatory information column 336. With the foregoing management information, there is an entry of the file system management information table 330 per stored file.

The storage path name column 331 stores the storage path name of the file stored in the online file storage. The storage account name column 332 stores the storage account name that was used upon creating the file. The storage account name corresponds to the owner of the file. The storage-side time information column 333 stores the file creation time, file access time, and file update time. The stored time is based on a timer (not shown) managed by the online file storage. The storage-side time information column 334 stores the same contents as the foregoing personal time information column 1824, and the detailed explanation thereof is omitted. The inode information column 335 stores inode information for managing the position information regarding in which physical location the file was disposed in the volume 340. The pointer to the explanatory information column 336 stores the point showing the path name of the explanatory information regarding the file contents. Explanatory information, for instance, is configured from text data.

The request format upon issuing a request to the initialization unit 130 and the request processor 140 and the request format to be issued from the request processor 140 to the online file storage are now explained with reference to FIG. 12 to FIG. 24.

FIG. 12 is a diagram showing an example of initialization request information upon the application 110 or a user issuing a command to the personal file management system 120 to create a file system.

As shown in FIG. 12, the initialization request information 131 has a request type 132, an online file storage list 133, and a storage account count 134. If the request type 132 is "initialization," the processing of the initialization unit 130 is executed. The online file storage list 133 designates the online file storage group to be used by the created file system. The online file storages to be used are designated in a storage identifier list (for example, STR1 to STR3). The personal file management system 120 determines the storage destination so that the online file storages designating the file will be balanced during the file creation. The storage account count 134 designates the number of accounts to be created in the respective online file storages 300, 400. If the storage account count is 10, the storage accounts to be used during the creation of a new file creation will be determined among the 10 created storage accounts.

FIG. 13 is a diagram showing an example of the request format 141 when the application 110 request the personal file management system 120 to create a file.

As shown in FIG. 13, the request format 141 has a request type 142, a personal path name 143, a personal account name 144, a data size 145, and a pointer to data 146. The request type 142 is set as "file creation." The personal path name 143 designates the path name of the file to be created in the name space managed by the personal file management system 120. The personal account name 144 designates with which personal account the file is to be created. The data size 145 is the size of data. The pointer to data 146 shows the address in the memory 102 of the PC 100 storing the data in the created file.

FIG. 14 is a diagram showing an example of the request format 500 when the personal file management system 120 requests the online file storage to create a file.

As shown in FIG. 14, the request format 500 has a request type 501, a storage path name 502, a storage account name 503, a data size 504, and a data 505. The request type 501 is set as "file creation." The data size 504 and the data 505 are designated according to the file creation request to the personal file management system 120. The storage path name 502 and the storage account name 503 are the same as the foregoing explanation, and the detailed explanation thereof is omitted.

FIG. 15 is a diagram showing an example of the request format 510 when the application 110 requests the personal file management system 120 to refer to a file.

The request format 510 has a request type 511, a personal path name 512, and a personal account name 513. The request type 511 is set as "file referral." The personal path name 512 designates the path name in the name space managed by the personal file management system 120. The personal account name 513 designates with which personal account the file is to be referred.

FIG. 16 is a diagram showing an example of the request format 520 when the personal file management system 120 requests the online file storage to refer to a file.

The request format 502 has a request type 521, a storage path name 522, and a storage account name 523. The request type 521 is set as "file referral." The storage path name 522 and the storage account name 523 are the same as the foregoing explanation, and the detailed explanation thereof is omitted.

FIG. 17 is a diagram showing an example of the request format 530 when the application 110 requests the personal file management system 120 to update the file.

The request format 530 has a request type 531, a personal path name 532, a personal account name 533, an offset 534, a size 535, and a pointer to data 536. The request type 531 is set as "file update." The personal path name 532 designates the path name in the name space managed by the personal file management system 120. The personal account name 533 designates with which personal account the file is to be referred. The offset 534 and the size 535 designate the position from the top of the file in which the data is to be updated. The pointer to data 536 shows the address in the memory 102 of the PC 100 storing the data in the file to be created.

FIG. 18 is a diagram showing an example of the request format 540 when the personal file management system 120 requests the online file storage to update the file.

As shown in FIG. 18, the update format 540 has a request type 541, a storage path name 542, a storage account name 543, an offset 544, a size 545, and a data 546. The request type 541 is set as "file update." The storage path name 542, the storage account name 543, the offset 544, and the size 545 are the same as the foregoing explanation, and the detailed explanation thereof is omitted. The data 545 is the file contents.

FIG. 19 is a diagram showing an example of the request format 550 when the application 110 requests the personal file management system 120 to delete the file.

As shown in FIG. 19, the request format 550 has a request type 551, a personal path name 552, and a personal account name 553. The request type 551 is set as "file deletion." The personal path name 552 designates the path name in the name space managed by the personal file management system 120. The personal account name 553 designates with which personal account the file is to be referred.

FIG. 20 is a diagram showing an example of the request format 560 when the personal file management system 120 requests the online file storage to delete the file.

As shown in FIG. 20, [the request format 560] has a request format 560, a request type 561, a storage path name 562, and a storage account name 563. The request type 561 is set as "file deletion." The storage path name 562 and the storage account name 563 are the same as the foregoing explanation, and the detailed explanation thereof is omitted.

Figure 21:
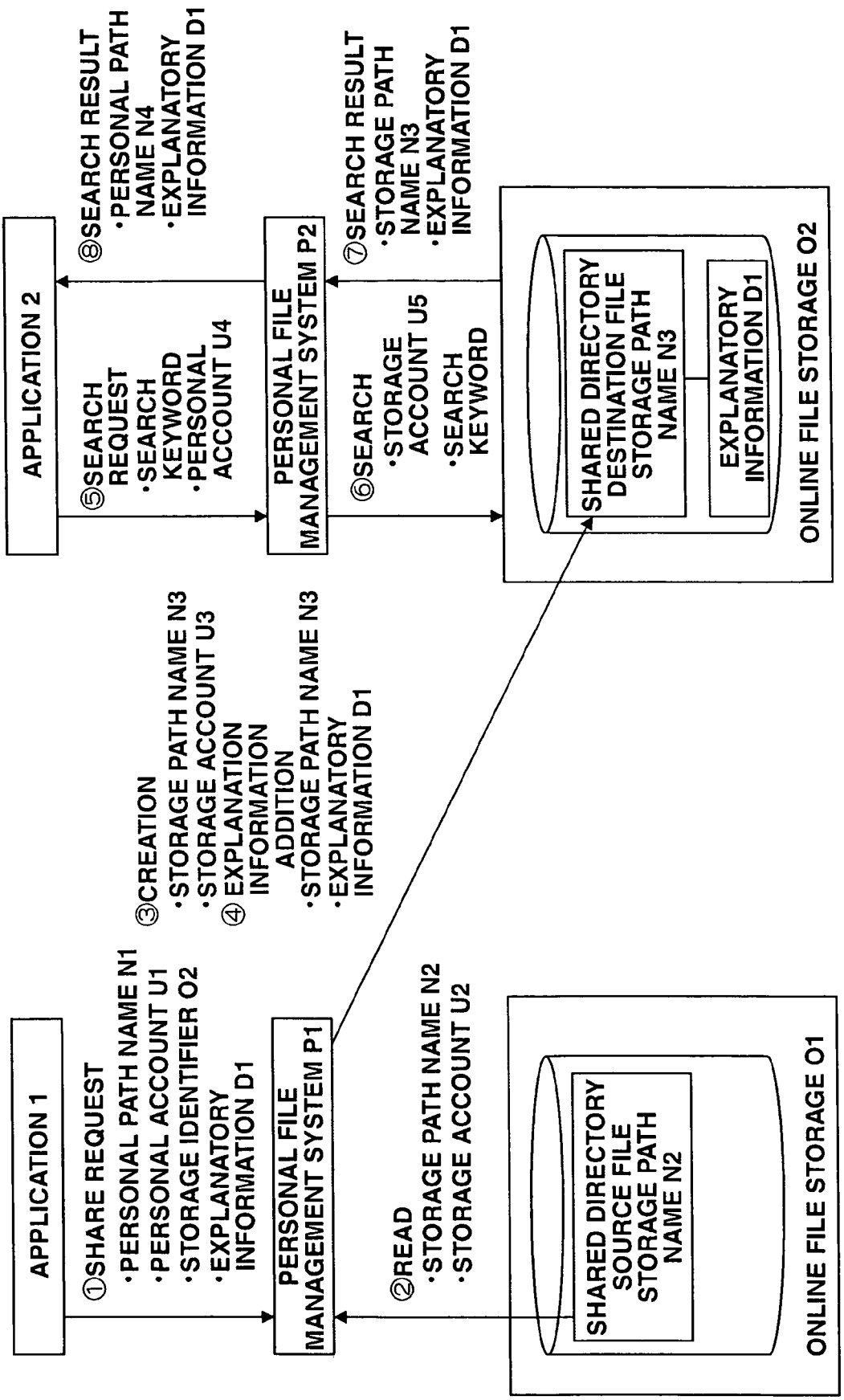
FIG. 21 is a diagram explaining the outline of share processing and search processing according to the first embodiment.

Outline of the processing when the sharing and searching of the file are requested to the request processor 140 is now explained. FIG. 21 is a diagram explaining the outline of this processing. In FIG. 21, a case is explained where the online file storages for sharing the file are online file storages 01, 02, and the applications and the personal file management systems are respectively applications 1, 2, and personal file management systems P1, P2. When corresponding this with the configuration shown in FIG. 1, for instance, the application 01 corresponds to the application 110, the application 02 corresponds to the application 210, the personal file management system P1 corresponds to the personal file management system 120, and the personal file management system P2 corresponds to the personal file management system 220.

A case of issuing a share request from the application 1 to the personal file management system P1 is foremost explained. This share request, for instance, includes a personal path name N1, a personal account U1, a storage identifier 02, and explanatory information D1. Subsequently, the personal file management system P1 reads the storage path name N2, the storage account U2, and the file from the online file storage 01. The personal file management system P1 thereafter uses the storage path name N3 and the storage account U3 to create a shared file in the online file storage 02. Next, the personal file management system P1 adds the explanatory information D1 to the online file storage 02 by using the storage path name N3. As a result of performing these four processes (corresponding to processes (1) to (4) in FIG. 21), the share source file (storage path name N2) in the online file storage 01 can be shared with the share destination file (storage path name N3) in the online file storage 02.

A case of issuing a file search request from the application 2 to the personal file management system P2 is now explained. This search request, for instance, includes a search keyword, and a personal account U4. Subsequently, the personal file management system P2 uses the storage account U5 and the search keyword to search inside the online file storage 02. The personal file management system P2 thereafter receives the search result, the storage path name N3, and the explanatory information D1 from the online file storage 02. Next, the personal file management system P2 outputs the search result, the personal path name N4, and the explanatory information D1 to the application 2. As a result of performing these four processes (corresponding to processes (5) to (8) in FIG. 21), the search result is output to the application 2.

FIG. 22 is a diagram showing an example of the request format 570 when the application 110 requests the personal file management system 120 to share the file.

As shown in FIG. 22, the request format 570 has a request type 571, a personal path name 572, a personal account name 573, a shared storage identifier 574, and explanatory information 575. The request type 571 is set as "file sharing request." The personal path name 572 designates the path name in the name space managed by the personal file management system 120. The personal account name 573 designates with which personal account the file sharing request is to be issued. The shared storage identifier 574 determines which online file storage (hereinafter referred to as the "share destination online file storage"; while the storage to store the original file is hereinafter referred to as the "share source online file storage 300") the file to be shared is to be copied. The explanatory information 575 is information for designating the information explaining the contents of the file to be shared.

FIG. 23 is a diagram showing an example of the request format 580 when the application 210 requests the personal file management system 220 to search for a file.

As shown in FIG. 23, the request format 580 has a request type 581, a personal account name 582, and a search keyword 583. The request type 581 is set as "file search." The personal account name 582 is a personal account name to be set when a new entry is to be allocated to the searched file in the file management table 180. The search keyword 583 is an arbitrary character string, and is used for searching a file corresponding to the explanatory information containing the character string.

Figures 24, 25:
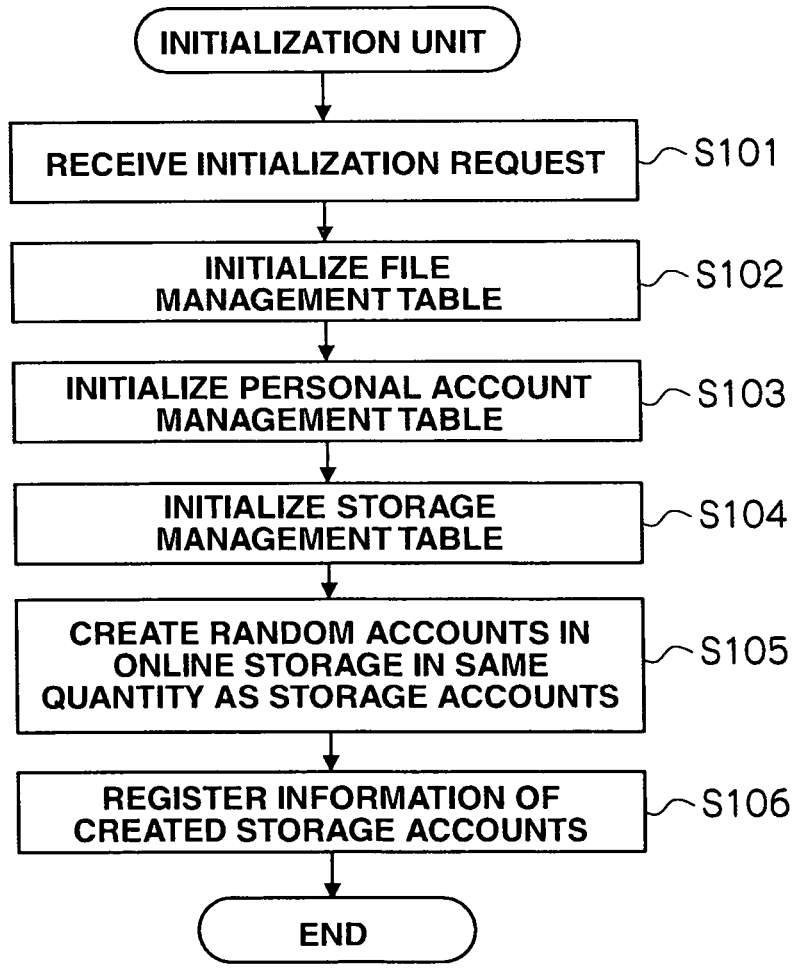
FIG. 24 is a diagram showing an example of a request format when requesting account management to the personal file management system according to the first embodiment.
FIG. 25 is a flowchart showing the processing to be executed by an initialization unit according to the first embodiment.

FIG. 24 is a diagram showing an example of the request format 590 when the application 110 requests the personal file management system 120 to manage the account.

As shown in FIG. 24, the request format 590 has a request type 591, a personal account name 592, a new password 593, and a storage account link 594. The request type 591 is set as "account creation or account deletion or password change." In other words, one among account creation, account deletion, or password change will be the request type. Account creation is a request for creating a new personal account, account deletion is a request for deleting an existing personal account, and password change is a request for changing the password of an existing personal account. The personal account name 592 shows the personal account name to be processed. The new password 593 is only used when creating an account and changing the password. The storage account link 594 is a flag for creating a storage account together with a personal account when creating an account, and changing the password of the storage account together with the password change of the personal account when changing the password.

The processing to the executed by the initialization unit 130 of the personal file management system 120 is now explained. FIG. 25 is a flowchart showing the processing to be executed by the initialization unit 130.

When the initialization unit 130 receives the initialization request 131 explained with reference to FIG. 12 from the (S101), it initializes the file management table 180 (S102). This initialization specifically clears all entries of the file management table 180. Subsequently, the initialization unit 130 initializes the personal account management table 160 (S103), and then initializes the storage management table 170 (S104). The initialization unit 130 thereafter randomly creates storage account names in the quantity of the storage account count 134 of the initialization request in the respective online file storages designated in the online file storage list 133 of the initialization request (S105). After creation, the initialization unit 130 registers information on the created storage accounts in the storage management table 170 (S106). Processing by the initialization unit 130 is thereby complete.

Although not shown in FIG. 25, when deleting the file system, the corresponding files are deleted from the online file storage regarding all files being managed by the file management table 180, all storage accounts are subsequently deleted upon referring to the storage management table 170, and the contents of the file management table 180, the personal account management table 160 and the storage management table 170 are lastly cleared. Deletion of the file system is thereby complete.

Figure 26:
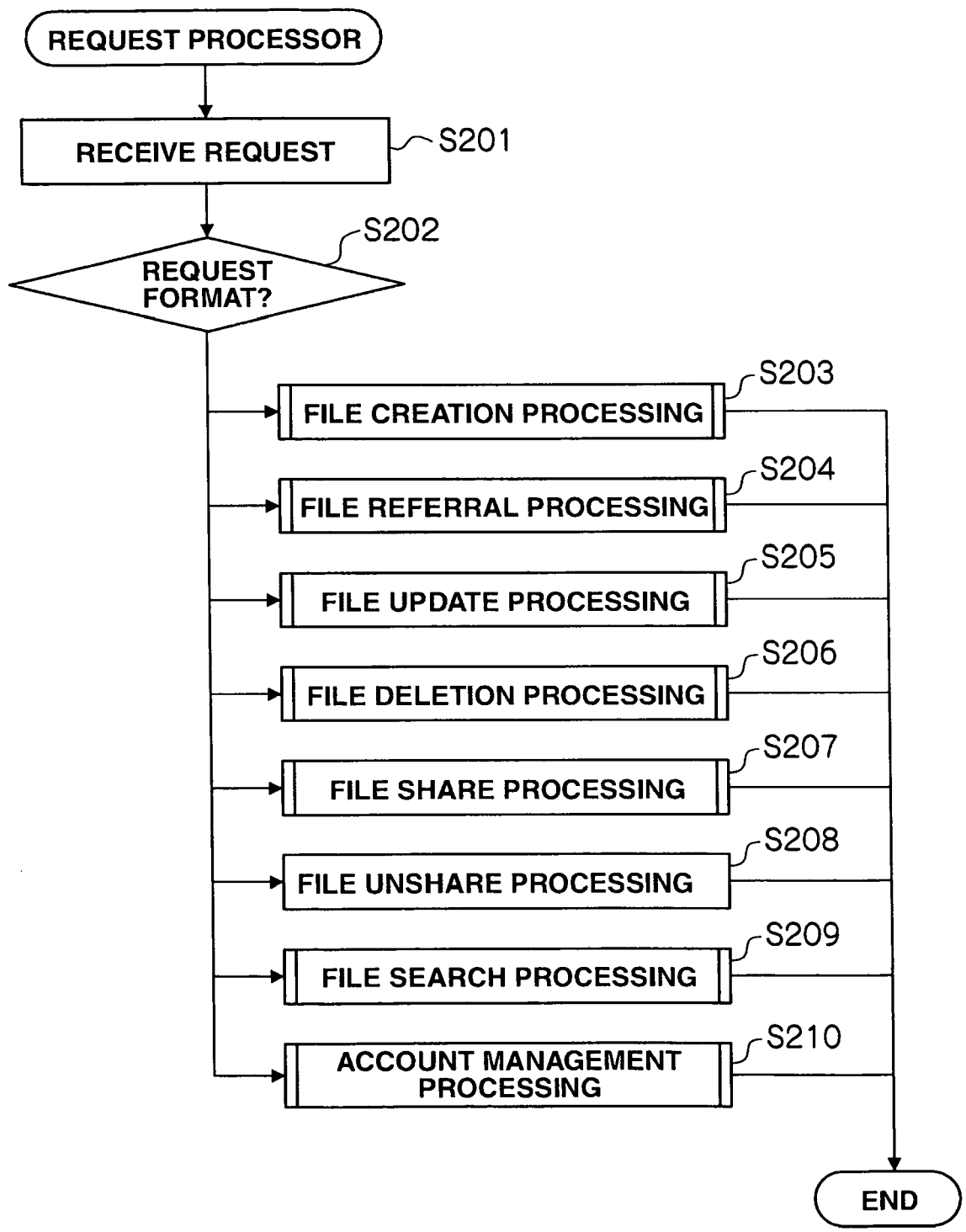
FIG. 26 is a flowchart showing the processing to be executed by a request processor according to the first embodiment.

The processing to be executed by the request processor 140 of the personal file management system 120 is now explained. FIG. 26 is a flowchart showing the processing to be executed by the request processor 140.

When the request processor 140 receives the file creation request explained with reference to FIG. 13, the file referral request explained with reference to FIG. 15, the file update request explained with reference to FIG. 17, the file deletion request explained with reference to FIG. 19, the file share request explained with reference to FIG. 22, the file search request explained with reference to FIG. 23, the account management request explained with reference to FIG. 24 and so on from the application 110 (S201), it determines the request type (S202). This determination is made based on the setting of the request type of request format of the received request.

If the request type is determined to be file creation at step S202, the request processor 140 executes the file creation processing (S203). If the request type is determined to be file referral at step S202, the request processor 140 executes the file referral processing (S204). If the request type is determined to be file update at step S202, the request processor 140 executes the file update processing (S205). If the request type is determined to be file deletion at step S202, the request processor 140 executes the file deletion processing (S206). If the request type is determined to be file sharing at step S202, the request processor 140 executes the file share processing (S207). If the request type is determined to be non-file sharing at step S202, the request processor 140 executes the file unshare processing (S208). If the request type is determined to be file search at step S202, the request processor 140 executes the file search processing (S209). If the request type is determined to be account management at step S202, the request processor 140 executes the account management processing (S210).

Like this, when any processing corresponding to the determination at step S202 is ended, this processing is complete. Details concerning the respective processing routines of the file creation processing (S203), the file referral processing (S204), the file update processing (S205), the file deletion processing (S206), the file share processing (S207), the file search processing (S209), and the account management processing (S210) will be explained later with reference to FIG. 27 to FIG. 33.

Figure 27:
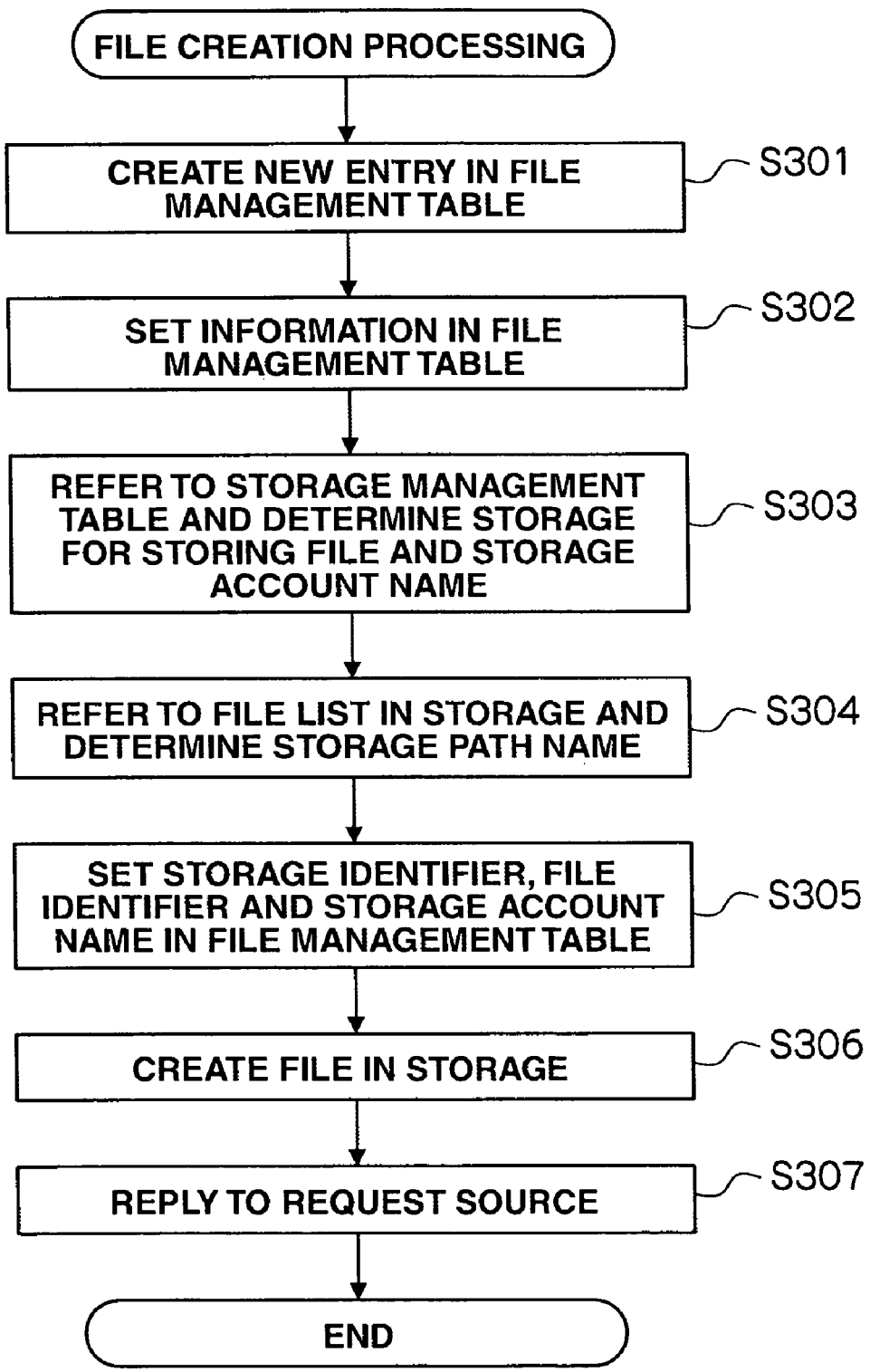
FIG. 27 is a flowchart showing file creation processing according to the first embodiment.

The file creation processing to be executed by the request processor 140 is foremost explained. FIG. 27 is a flowchart showing the file creation processing. In this file creation processing, the request processor 140 creates a new entry in the file management table 180, manages the privacy information with the new entry, and creates a file in the online file storage 300.

The request processor 140 creates a new entry in the file management table 180 (S301). The request processor 140 sets information in the file management table 180. Specifically, the request processor 140 sets information designated in the file creation request in the personal path name column 1821 and the personal account name column 1822 of the file management table 180. The request processor 140 configures the setting in the personal access authority information column 1823 according to the configuration policy of the access authority set per directory to which the file belongs. For example, the setting may be such that only the owner is able to read/write, and the other accounts are read only. The request processor 140 sets the current time in the personal time information column 1824 by referring to a time (not shown) of the personal file management system 120. Since files are not shared during file creation, the share flag column 1841 is set to "OFF," the share destination entry number column 1842 is set to "N/A," and the file type column 1843 is set to "ORIG." When the request processor 140 is to encrypt and store the data, it determines an encryption key and sets the determined encryption key in the encryption key column 1835 of the entry of the file management table 180 (S302).

Subsequently, the request processor 140 refers to the used file count column 175 of the storage management table 170, and finds the entry with the smallest number. The storage identifier of the online file storage in which the file is to be created and the storage account name to be used during file creation are thereby determined (S303). Another embodiment where a plurality of different personal accounts use the same storage account to create the respective files is also possible.

The request processor 140 thereafter randomly determines the storage path name. Thereupon, [the request processor 140] checks whether the same storage path name exists in the online file storage 300, and determines a unique storage path name (S304).

Subsequently, the request processor 140 sets the determined storage identifier, storage path name, and storage account name in the file management table 180 (S305). If necessary, the storage access authority information is set during file sharing.

The request processor 140 thereafter logs onto the online file storage using the password corresponding to the decided storage account name, and creates a file of the determined path name (S306). An example of the request format 500 of the file creation request to the online file storage has been described with reference to FIG. 14 above. The request processor 140 sends a file creation completion reply to the application 110 of the request source (S307). The file creation processing is thereby complete.

Figure 28:
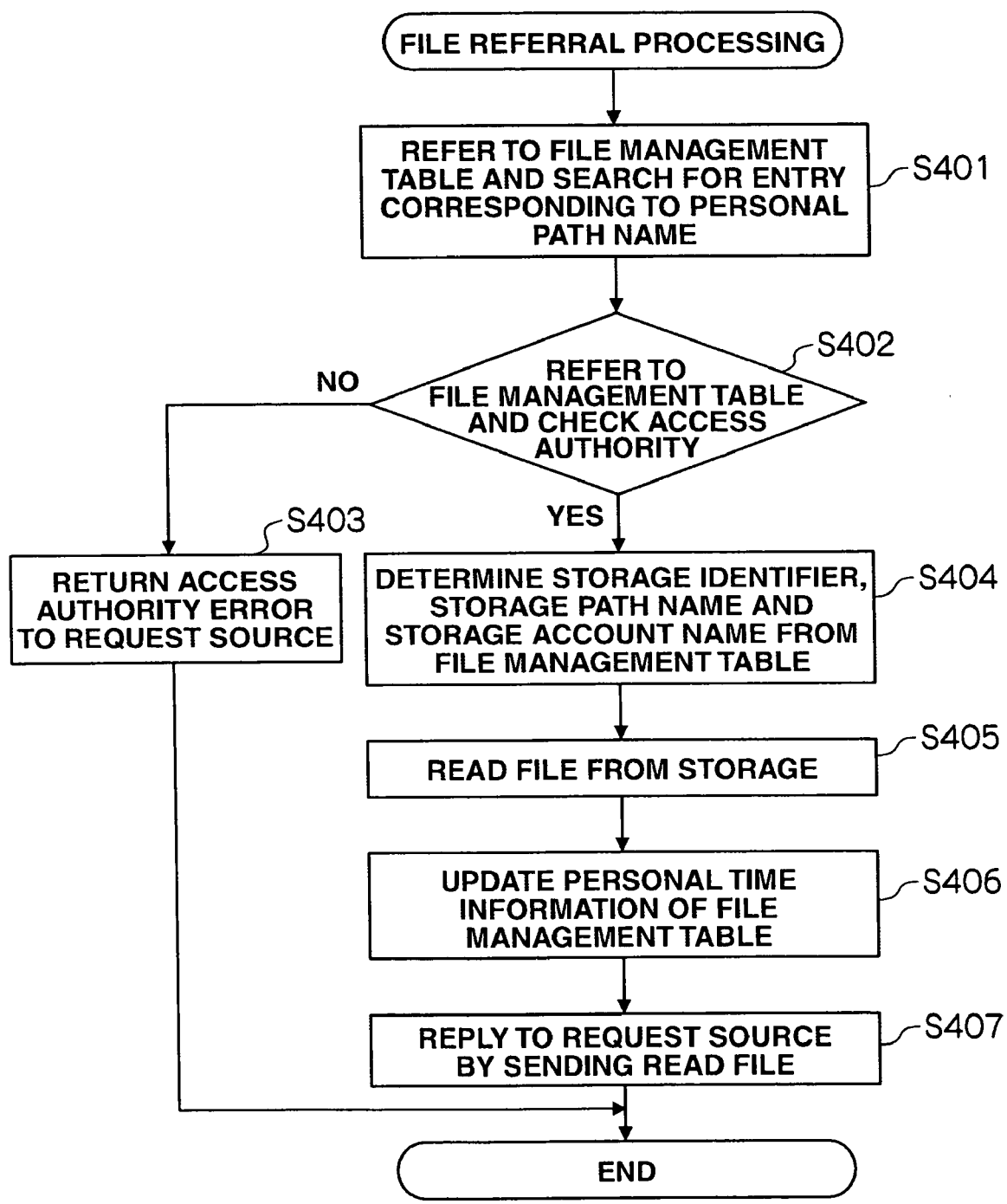
FIG. 28 is a flowchart showing file referral processing according to the first embodiment.

The file referral processing to be executed by the request processor 140 is now explained. FIG. 28 is a flowchart showing the file referral processing. In this file referral processing, the request processor 140 specifies the file in the online file storage corresponding to the personal path name requested from the file management table 180, reads the file from the online file storage, and thereafter returns the read file to the application 110.

Foremost, the request processor 140 searches for the respective entries of the file management table 180, and picks out the entry that matches the designated personal path name (S401). Then, the request processor 140 refers to the personal access authority information column 1823 of the file management table 180, and determines whether the designated account has the authority to refer to the file (S402). If it is determined at step S402 that there is no authority, the request processor 140 returns an access authority error to the application 110 of the request source, and then ends the processing (S403).

Meanwhile, if it is determined at step S402 that there is authority, the request processor 140 determines the storage identifier, storage path name, and storage account name corresponding to the personal path name from the entry of the file management table 180 (S404). Then, the request processor 140 logs onto the online file storage corresponding to the determined storage identifier using the password corresponding to the determined storage account name, and reads the files corresponding to the determined storage path name (S405). An example of the request format 520 of the file referral request to the online file storage has been explained with reference to FIG. 16 above.

Subsequently, the request processor 140 updates the access time of the personal time information column 1824 of the file management table 180 (S406), returns the read file to the application 110, and then ends the processing (S407). The file referral processing is thereby complete.

Figure 29:
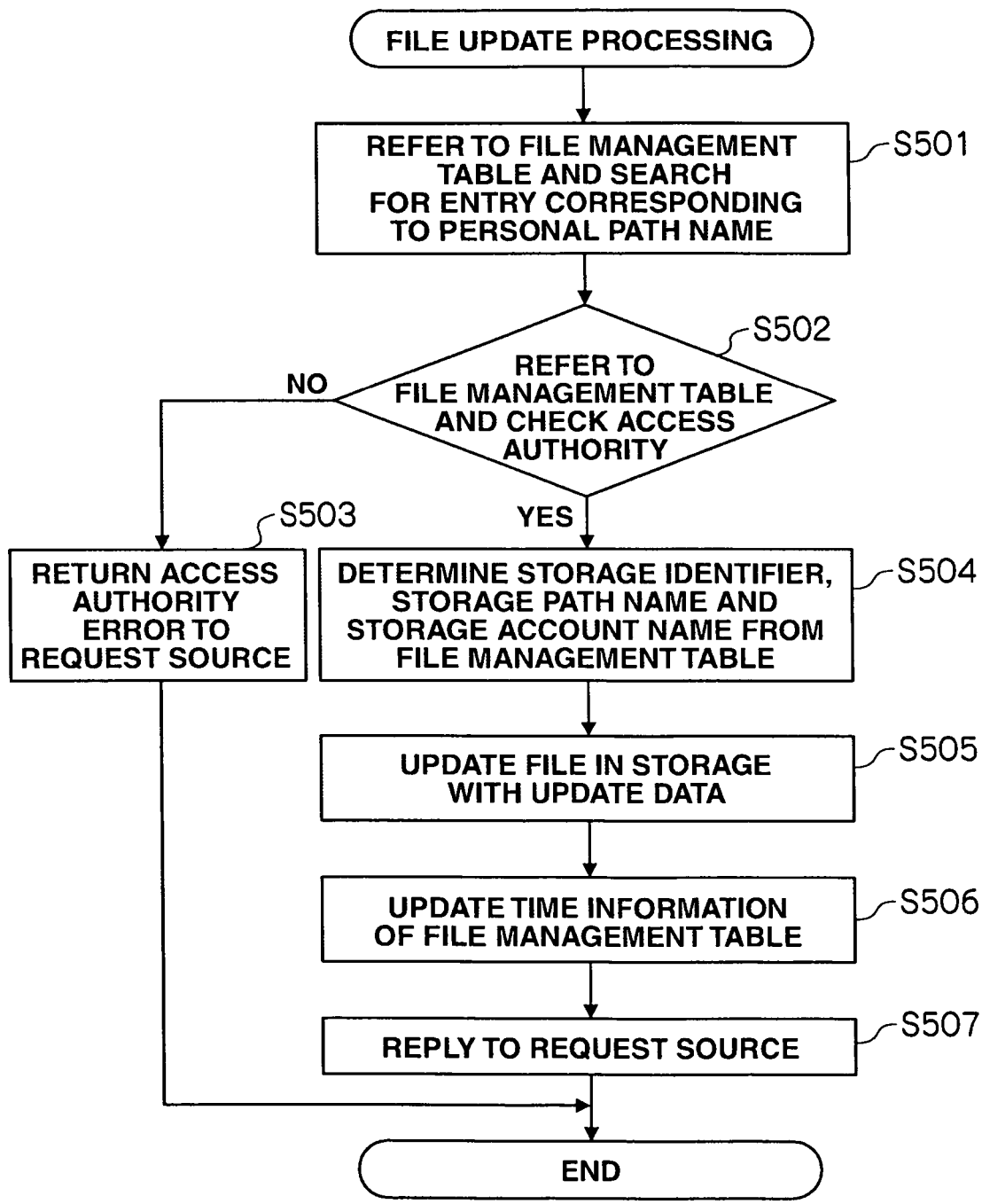
FIG. 29 is a flowchart showing file update processing according to the first embodiment.

The file update processing to be executed by the request processor 140 is now explained. FIG. 29 is a flowchart showing the file update processing. In this file update processing, the request processor 140 specifies the file in the online file storage corresponding to the personal path name requested from the file management table 180, and updates the file in the online file storage with update data.

Foremost, the request processor 140 searches for the respective entries of the file management table 180, and picks out the entry that matches the designated personal path name (S501). The request processor 140 refers to the personal access authority information column 1823 of the file management table 180, and determines whether the designated account has the authority to update the file (S502). If it is determined at step S502 that there is no authority, the request processor 140 returns an access authority error to the application 110 of the request source, and then ends the processing (S503).

Meanwhile, if it is determined at step S502 that there is no authority, the request processor 140 determines the storage identifier, storage path name, and storage account name corresponding to the personal path name from the entry of the file management table 180 (S504).

Then, the request processor 140 logs onto the online file storage corresponding to the determined storage identifier using the password corresponding to the determined storage account name, and updates the files corresponding to the determined storage path name with the designated data (S505). An example of the request format 540 of the file update request to the online file storage has been explained with reference to FIG. 18 above.

Subsequently, the request processor 140 updates the access time and update time of the personal time information column 1824 of the file management table 180 (S506), and sends a reply to the application 110 of the request source (S507). The file update processing is thereby complete.

Figure 30:
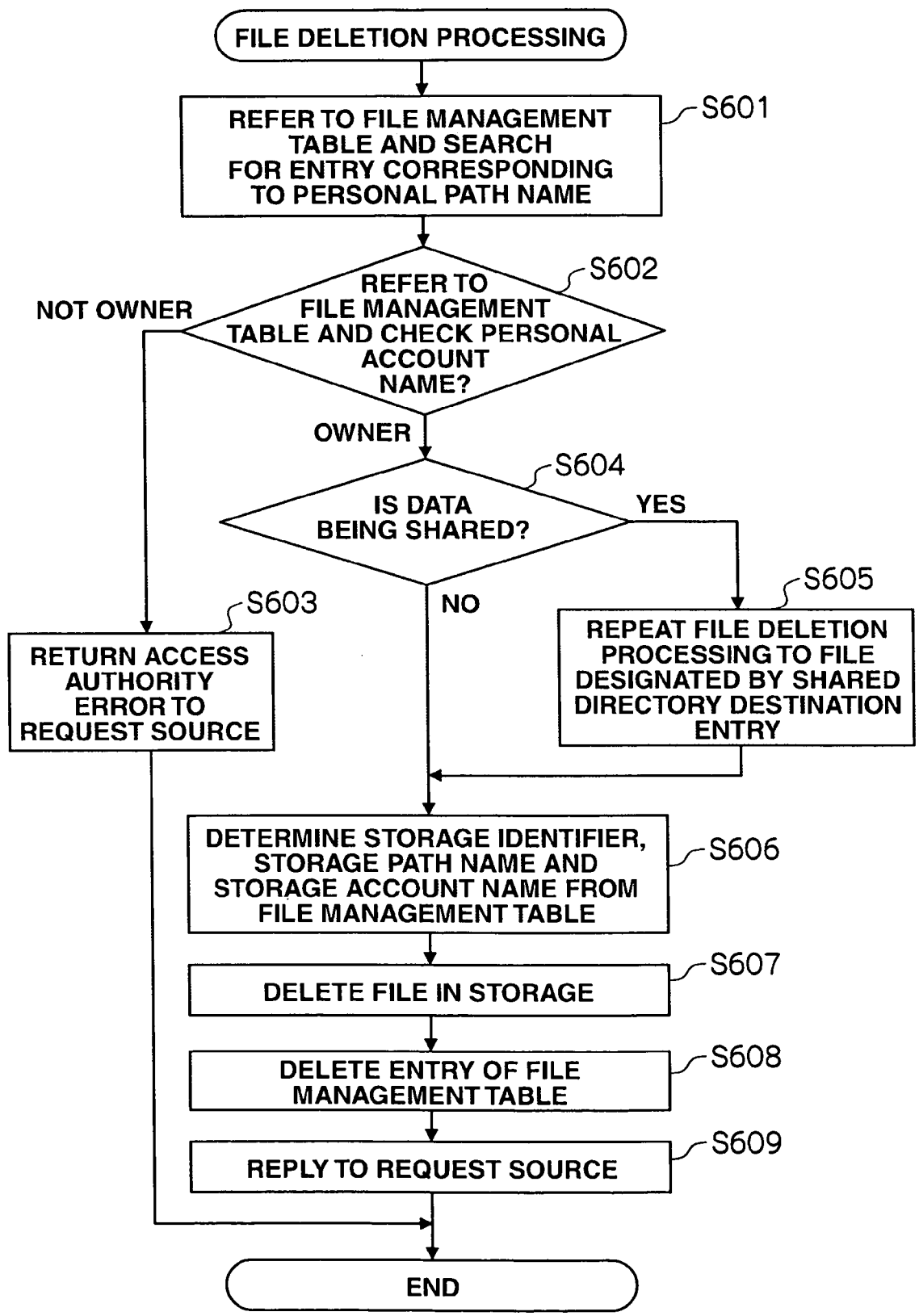
FIG. 30 is a flowchart showing file deletion processing according to the first embodiment.

The file deletion processing to be executed by the request processor 140 is now explained. FIG. 30 is a flowchart showing the file deletion processing. In this file deletion processing, the request processor 140 specifies the file in the online file storage corresponding to the personal path name requested from the file management table 180, deletes the file from the online file storage, and thereafter also deletes the entry of the file management table 180. Since the copied files of the original files to be deleted are also deleted during file sharing, this processing will be called recursively.

Foremost, the request processor 140 searches for the respective entries of the file management table 180, and picks out the entry that matches the designated personal path name (S601). Then, the request processor 140 refers to the personal account name column 1822 of the file management table 180, and determines whether the designated account is an owner allowed to delete the files (S602). If it is determined at step S602 that this is not the owner, the request processor 140 returns an access authority error to the application 110 of the request source, and then ends the processing (S603).

Meanwhile, if it is determined at step S602 that this is the owner, the request processor 140 refers to the share flag column 1841 of the file management table 180, and determines whether the file is currently being shared (S604). If it is determined at step S604 that the file is being shared, the request processor 140 specifies a copied file of the file from the file management table 180, and recursively executes the file deletion processing in order to delete the file (S605).

Subsequently, if it is determined at step S602 that the file is being shared, or when the shared file is deleted at step S605, the request processor 140 determines the storage identifier, storage path name, and storage account name corresponding to the personal path name from the file management table 180 (S606).

Then, the request processor 140 logs onto the online file storage corresponding to the determined storage identifier using the password corresponding to the determined storage account name, and deletes the files corresponding to the determined storage path name (S607). An example of the request format 560 of the file deletion request to the online file storage has been explained with reference to FIG. 20 above.

Then, the request processor 140 deletes the entry corresponding to the deleted file from the file management table 180 (S608), and sends a reply to the application 110 of the request source (S609). The file deletion processing is thereby complete.

Figure 31:
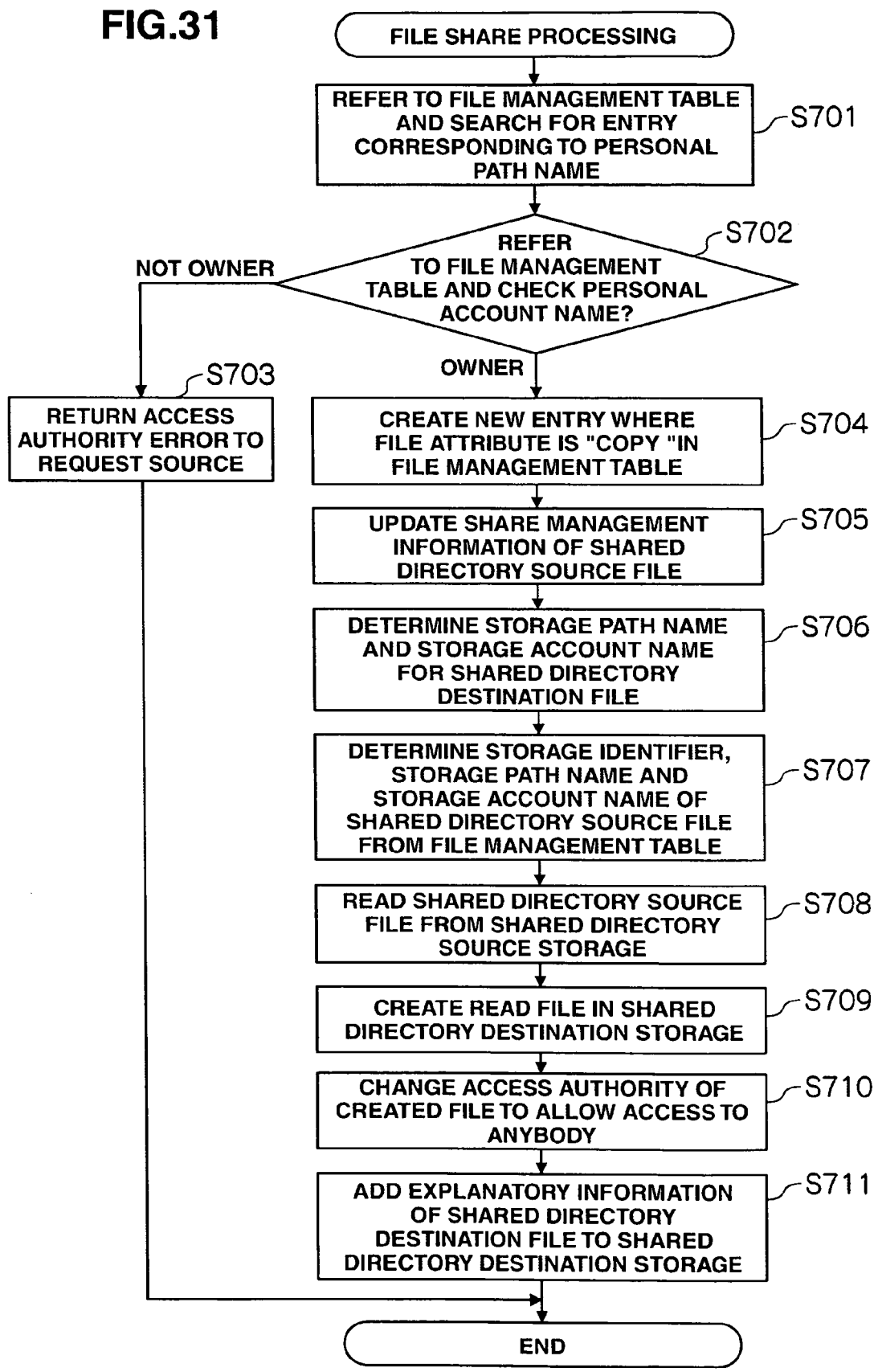
FIG. 31 is a flowchart showing file share processing according to the first embodiment.

The file share processing to be executed by the request processor 140 is now explained. FIG. 31 is a flowchart showing the file share processing. In this file share processing, the request processor 140 specifies the file in the online file storage corresponding to the personal path name requested from the file management table 180, creates a copy of the file in the online file storage designated together with the explanatory information, and manages the relationship of the original and copy in the file management table 180. FIG. 31 shows the details of the file share processing schematically explained with reference to FIG. 21.

Foremost, the request processor 140 searches for the respective entries of the file management table 180, and picks out the entry that matches the designated personal path name ("personal path name N1" in FIG. 21) (S701). Then, the request processor 140 refers to the personal account name column 1822 of the file management table 180, and determines whether the designated account ("personal account U1" in FIG. 21) is an owner allowed to share files (S702). If it is determined at step S702 that the owner is not allowed to share files, the request processor 140 returns an access authority error to the application 110 of the request source, and then ends the processing (S703).

Meanwhile, if it is determined at step S702 that the owner is allowed to share files, the request processor 140 creates a new entry where the file type column 1843 of the file management table 180 is "COPY." Thereupon, "N/A" is set in the personal path name column 1821 and the personal account name column 1822 (S704).

Then, the request processor 140 sets "ON" in the share flag column 1841, sets the number of the new entry in the share destination entry number column 1842, and updates the share management information of the share source file in relation to entries of the file management table 180 corresponding to the file to be shared (S705).

Subsequently, the request processor 140 randomly determines the storage path name ("N2" in FIG. 21) for the copied file so that it will be unique in the share destination online file storage ("online file storage 02" in FIG. 21). The request processor 140 additionally determines the storage account name ("U2" in FIG. 21) upon creating a copied file in the share destination online file storage from the storage management table 170. Then, the request processor 140 sets the storage identifier, storage path name, and storage account name of the share source file in the new entry of the file management table 180. "OFF" is set in the share flag and "N/A" is set in the share destination entry number (S706).

Subsequently, the request processor 140 determines the storage identifier, storage path name, storage account name (storage identifier 01, storage path name N2, storage account name U2 in FIG. 21) corresponding the file to be shared (hereinafter referred to as the "share source file") from the file management table 180 (S707).

The request processor 140 thereafter reads the share source file from the share source online file storage ("online file storage 01 in FIG. 21) (S708), and creates the file read from the share source online file storage using the storage account name ("U3" in FIG. 21) in the share destination online file storage as a new file designated with the storage path name ("N3" in FIG. 21) (S709).

Subsequently, the request processor 140 changes the storage-side access authority of the file designated with the storage path name ("N3" in FIG. 21) in the share destination online file storage to be accessible from any storage account (S710). Nevertheless, as another embodiment, the setting may be configured such that access is only allowed from a specific storage account group. If necessary, the contents set to the share destination online file storage 300 may be retained in the storage access authority information column 1834 of the file management table 180 of the personal file management system 120.

The request processor 140 thereafter uses the storage path name ("N3" in FIG. 21) to add the explanatory information D1 to the share destination file in the share destination online file storage. The share destination online file storage stores the explanatory information D1 in one's own file system, and sets a pointer to the explanatory information D1 in the entry corresponding to the file with one's own file system management information (S711). The file share processing is thereby complete.

The file unshare processing to be executed by the request processor 140 is now explained. In the file unshare processing, the request processor 140 deletes the share management information of the file that is not to be shared from the file management table 180, deletes the entry of the corresponding copied file, and deletes the copied file and the explanatory information from the online file storage storing the copy.

Figure 32:
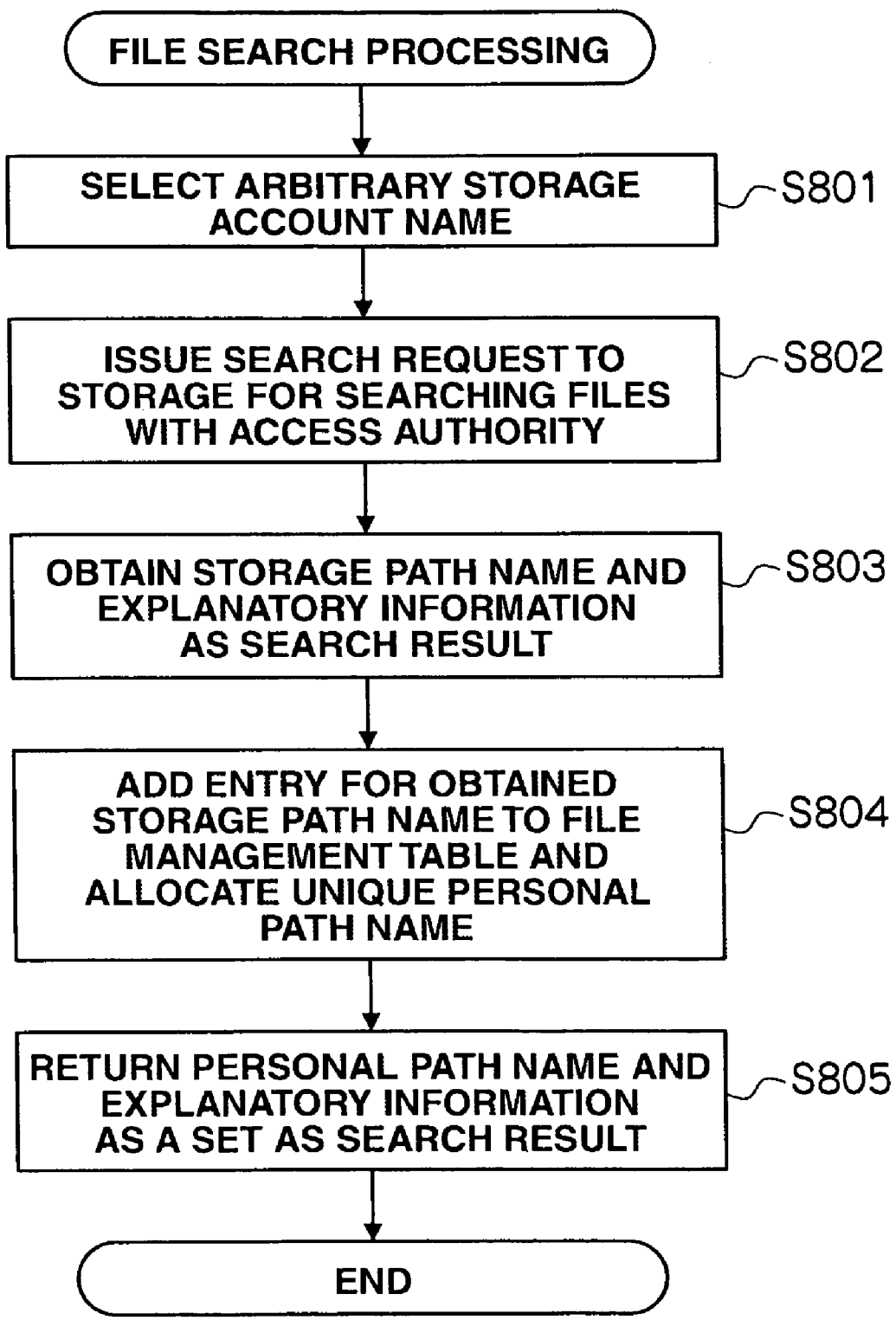
FIG. 32 is a flowchart showing file search processing according to the first embodiment.

The file search processing to be executed by the request processor 140 is now explained. FIG. 32 is a flowchart showing the file search processing. In this file search processing, when the request processor 140 receives the personal account name ("U4" in FIG. 21) and the search keyword (for instance, W1) from the application 210, it searches the file containing the search keyword from the online file storage, and registers the searched file as a new file in the file management table 180.

Foremost, the request processor 140 (request processor in the personal file management system P2 in FIG. 21) selects an arbitrary storage account name ("U5" in FIG. 21) corresponding to the online file storage (online file storage 02 in FIG. 21) to be searched from the storage management table 170. When there are a plurality of online file storages to be searched, the following processing is repeated for each online file storage (S801).

Subsequently, the request processor 140 issues a search request to the online file storage by designating a search keyword (for instance, "W1") targeting the file group that can be accessed by the selected storage account name (S802). The online file storage-side searches for the explanatory information ("D1" in FIG. 21) corresponding to the file group accessible from the designated storage account, and returns a list to the request processor 15 with the path name of the file group matching the search keyword and the corresponding explanatory information ("N3" and "D1" in FIG. 21) as a set.

The request processor 140 thereafter obtains, as the search result, a list of the storage path name and the explanatory information ("N3" and "D1" in FIG. 21) as a set (S803).

Subsequently, the request processor 140 creates a new entry in the file management table 180 for each obtained storage path name (N3), and allocates and sets the arbitrary unique personal path name (N4). As the personal account name, the personal account name ("U4" in FIG. 21) designated by the application 110 in the search request is set. The personal access information authority also follows the configuration policy as in the case during file creation. Information ("02", "N3," "U5" in FIG. 21) at steps S801 and S803 is set in the storage identifier column 1831, the storage path name column 1832, and the storage account name column 1833. The share management information column 184 is cleared.

The request processor 140 thereafter returns to the application 110, as the search result, a list with the newly created personal path and the corresponding explanatory information ("N4" and "D1") as a set (S805). The file search processing is thereby complete. The application 110 will be able to access the searched file by designating the personal path name ("N4").

Figure 33:
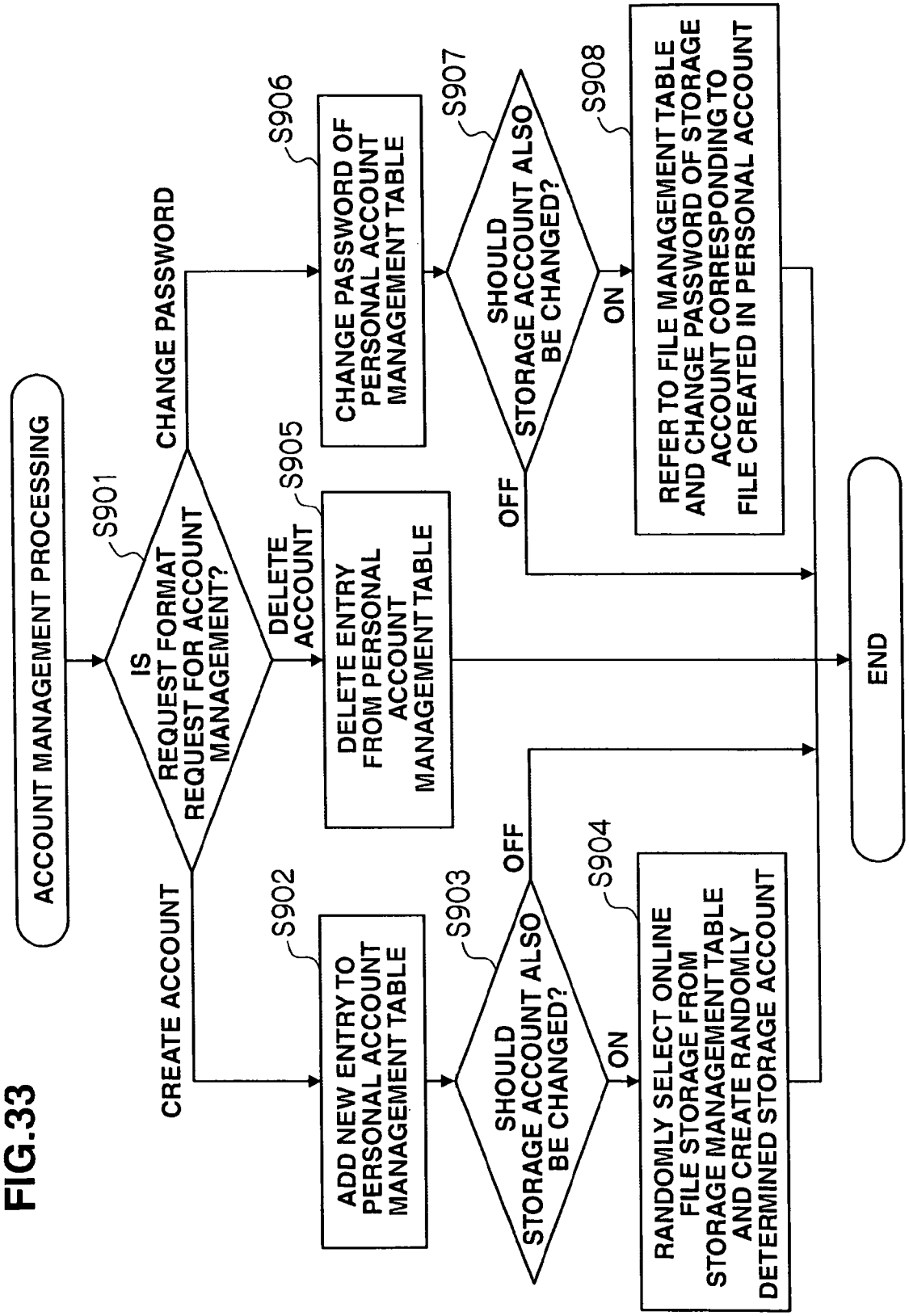
FIG. 33 is a flowchart showing account management processing according to the first embodiment.

The account management processing to be executed by the request processor 140 is now explained. FIG. 33 is a flowchart showing the account management processing. In this account management processing, the request processor 140 creates and deletes the account in and from the personal file management system 120, and requests the changing of the password.

Foremost, the request processor 140 determines the request type of the account management. The request type is determined based on the information set in the request type column 591 of the request format 590 explained with reference to FIG. 24 (S901). If the request type is "account creation," the routine proceeds to step S902, if the request type is "account deletion," the routine proceeds to step S905, and if the request type is "password change," the routine proceeds to step S906.

If it is determined at step S901 that the request type is "account creation," the request processor 140 adds a new entry to the personal account management table 160, and sets the personal account name, password, and password expiration date designated in the account management request. As the password expiration date, a period predetermined by the system is set (S902).

Then, the request processor 140 determines whether the storage account is to also be changed (S903), and this is determined based on whether the flag of the storage account link of the account management request is "ON" or "OFF." If the flag is "OFF," the processing is ended.

Meanwhile, if the flag is "ON," the request processor 140 randomly selects the online file storage from the storage management table 160, and thereafter randomly determines the unique new storage account in the online file storage and the account password. Finally, the [request processor 140] creates the storage account in the online file storage, and adds a new entry in the storage management table 160 (S904).

If it is determined at step S901 that the request type is "account deletion," the request processor 140 deletes the entry of the designated personal account from the personal account management table 160, and then ends the processing.

Meanwhile, if it is determined at step S901 that the request type is "password change," the request processor 140 searches for the entry corresponding to the personal account name designated in the account management request from the personal account management table 160, and updates the password with the designated password. The password expiration date is also reset to a new value (S906).

Subsequently, the request processor 140 determines whether the storage account should also be changed (S907). This is determined based on whether the flag of the storage account link of the account management request is "ON" or "OFF." If the flag is "OFF," the processing is complete.

Meanwhile, if the flag is "ON," the request processor 140 refers to the file management table 180, and lists all files created in the personal account name designated in the account management request. The [request processor 140] lists the storage accounts used upon storing all files in the list into the online file storage, randomly determines a password for all storage accounts in the list, and requests the online file storage change the password of the storage account. Finally, the [request processor 140] updates the password column and the password expiration date column of the storage management table 170 (S908).

Figure 34:
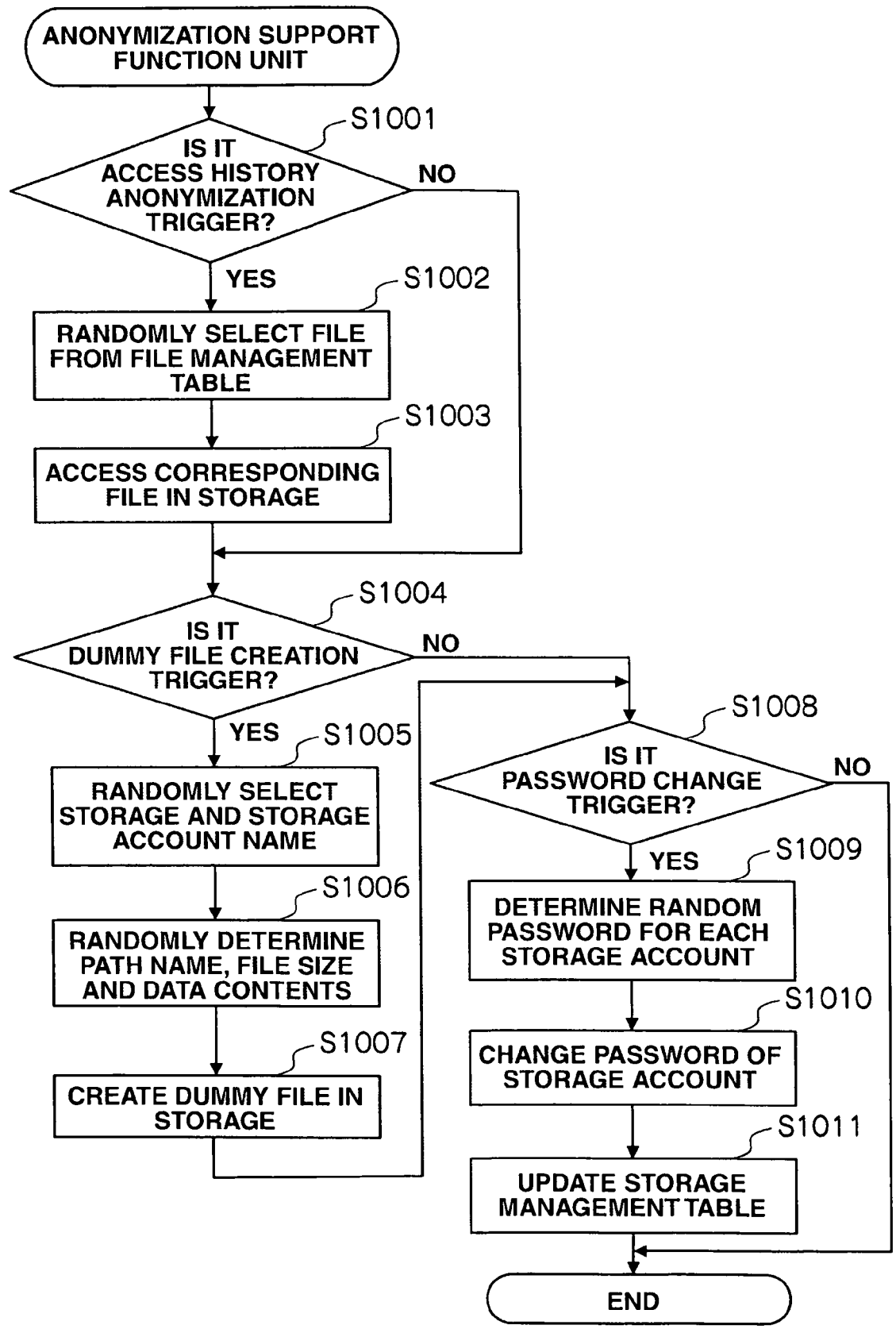
FIG. 34 is a flowchart showing the processing to be executed by an anonymization support function unit according to the first embodiment.

The processing of the anonymization support function unit 150 is now explained. FIG. 34 is a flowchart showing the processing to be executed by the anonymization support function unit 150. The anonymization support function unit 150 accesses files in the online file storage irrelevant to the file access request from the application 110, maintains the anonymity concerning the access history by creating a random file, and prevents the cracking of passwords by periodically changing the password of the storage account.

Foremost, the anonymization support function unit 150 refers to the anonymization trigger table 190 explained with reference to FIG. 9, and determines whether it is an access history anonymization trigger by comparison with the current time obtained from a timer (not shown) (S1001). If it is determined that this is an access history anonymization trigger, the anonymization support function unit 150 randomly selects a file from the file management table 180 (S1002), and accesses the file in the online file storage. Thereupon, the time information managed by the file management table 180 of the personal file management system 120 is not updated. Whether to read or write data during the file access is determined randomly. In the case of write data, data is read once and then such data is written into the same position of the file in order to prevent the file contents from changing (S1003).

When the processing at step S1003 is ended, or if it is determined at step S1001 that the trigger is not an access history anonymization trigger, the anonymization support function unit 150 refers to the anonymization trigger table 190, and determines whether the trigger is a dummy file creation trigger (S1004). If it is determined to be a dummy file creation trigger, the anonymization support function unit 150 randomly selects the online file storage and the storage account name from the storage management table 170 (S1005). The anonymization support function unit 150 randomly determines a storage path name that does not exist in the online file storage, and then randomly determines the file size and data contents (S1006). Subsequently, the anonymization support function unit 150 creates a dummy file in the selected online file storage with the determined storage path name using the selected storage account. After creation, the [anonymization support function unit 150] adds the management information of the dummy file to the file management table 180 (S1007).

When the processing at step S1007 is ended, or if it is determined at step S1004 that the trigger is not a dummy file creation trigger, the anonymization support function unit 150 refers to the anonymization trigger table 190, and determines whether the trigger is a password change trigger (S1008). If it is determined that it is a password change trigger, the anonymization support function unit 150 determines a random new password for all storage accounts of the storage management table 170 (S1009). Then, the anonymization support function unit 150 updates the password of the storage account with the new password in the online file storage (S1010). Subsequently, the anonymization support function unit 150 updates the password column 173 of the storage management table 170 with the new password (S1011). If it is determined that it is not the processing at step S1011 or the password change trigger at step S1008, the processing is ended.

According to this first embodiment, since the privacy protection file sharing system 1 is configured such that the privacy information capable of identifying individuals is separated from the information used for processing the file in the online file storage when a user is to create or update files in the online file storage, it is possible to protect the privacy information of users without hampering the convenience of users, and prevent the online file storage-side from specifying the privacy information of users.

The privacy protection file sharing system 1 is also able to share data among a plurality of individuals via the online file storage while protecting the privacy information of users.

Second Embodiment

The second embodiment is now explained. The second embodiment differs from the first embodiment in that it protects privacy information by partitioning a single file into a plurality of subfiles, and storing the respective subfiles in separate online file storages. Thus, the following explanation focuses on the differences between the first and second embodiments, and the detailed explanation thereof is omitted.

Figure 35:
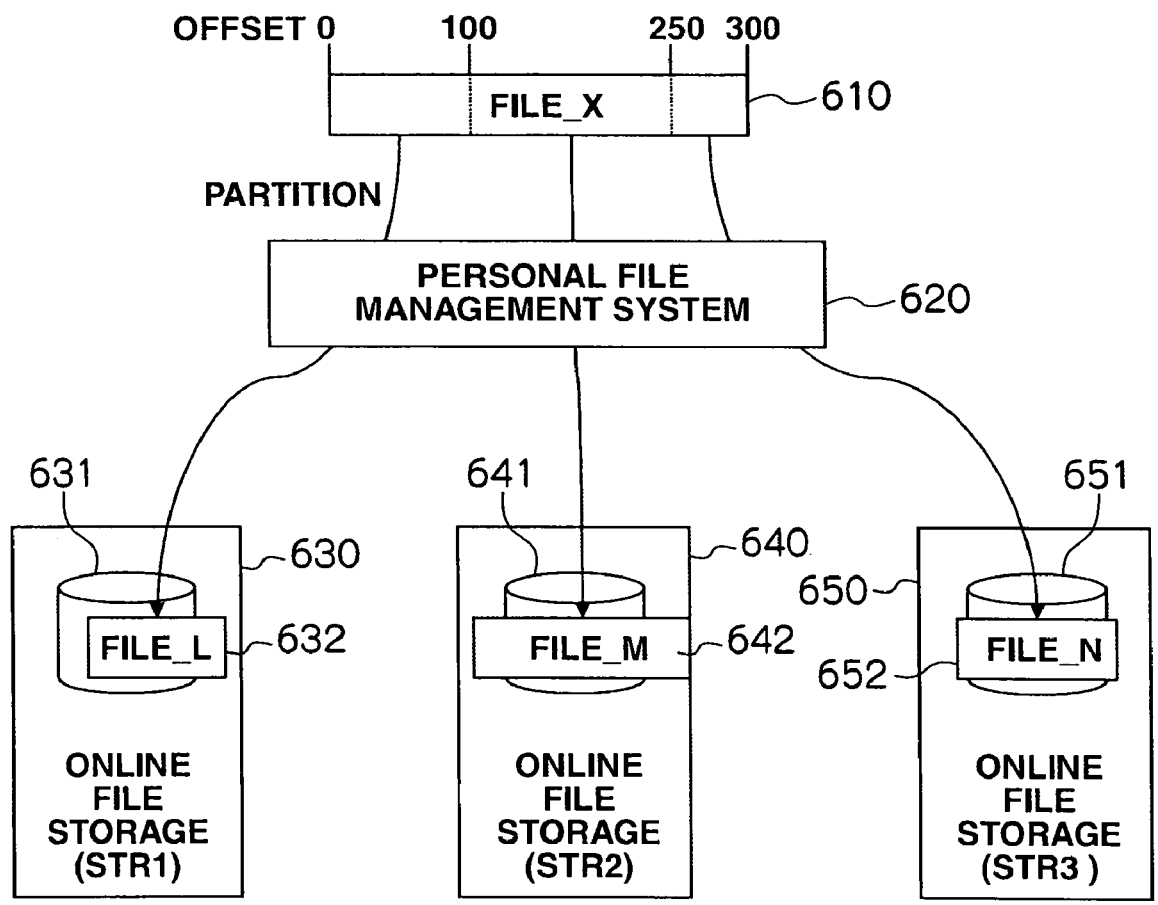
FIG. 35 is a diagram schematically showing the configuration of a system according to the second embodiment of the present invention.

FIG. 35 is a diagram schematically showing the configuration of a privacy protection file sharing system 2 in the second embodiment. As shown in FIG. 35, in the privacy protection file sharing system 2, when the personal file management system 620 is to create a new file X610, the file X610 is sectioned at the $0^{th}$, $100^{th}$ and $250^{th}$ offset, and partitioned into the three subfiles of subfile L632, subfile M642, and subfile N652. These subfiles are respectively stored in the online file storages 630, 640, 650.

FIG. 36 is a diagram showing the file management table 180 managed by the personal file management system 620 in the system 2. The second embodiment differs from the first embodiment in that a subfile configuration information column 185 is provided. The other elements are the same as the first embodiment and are given the same reference numeral, and the detailed explanation thereof is omitted.

The subfile configuration information column 185 has an offset column 1851, a size column 1852, and a next entry column 1853. The subfile configuration information stored in the subfile configuration information column 185 shows how the file has been partitioned, and the type of continuity among the subfiles.

As shown in FIG. 36, in the offset column 1851, from the top to the $100^{th}$ address of the file X610 is sectioned as the first subfile, from the $100^{th}$ address to the $250^{th}$ address of the file X610 is sectioned as the second subfile, and from the $250^{th}$ address to the $300^{th}$ address of the file X610 is sectioned as the third subfile. The size column 1852 shows the size of the respective subfiles (files L, M, N). The next entry column 1853 shows the order among the subfiles. The subfile of entry number 001 follows the subfile of entry number 002. Since the subfile of entry number 003 is at the end, "N/A" is stored in the next entry column 1853.

In the second embodiment, since the files in the online file storages 630, 640, 650 are associated for each subfile L632, subfile M642, and subfile N652, the correspondence is managed with the information stored in the storage identifier column 1831 of the storage management information column 183 in the file management table 180. In FIG. 36, the subfile of entry number 001 is associated with the file designated with the storage path name "/ABC/FILE_X" of the online file storage 630 identified by the storage identifier "STR1."

According to the second embodiment, since one file X610 can be partitioned into three subfiles L, M, N and be respectively stored in the online file storages 630, 640, 650, it is possible to increase the protection level of privacy information even further than the first embodiment.

Third Embodiment

The third embodiment is now explained. The third embodiment differs from the first embodiment in that the IP address is anonymized when a unique IP (Internet Protocol) address is allocated to each PC. Thus, the following explanation focuses on the differences between the first and third embodiments, and the detailed explanation thereof is omitted.

Figure 37:
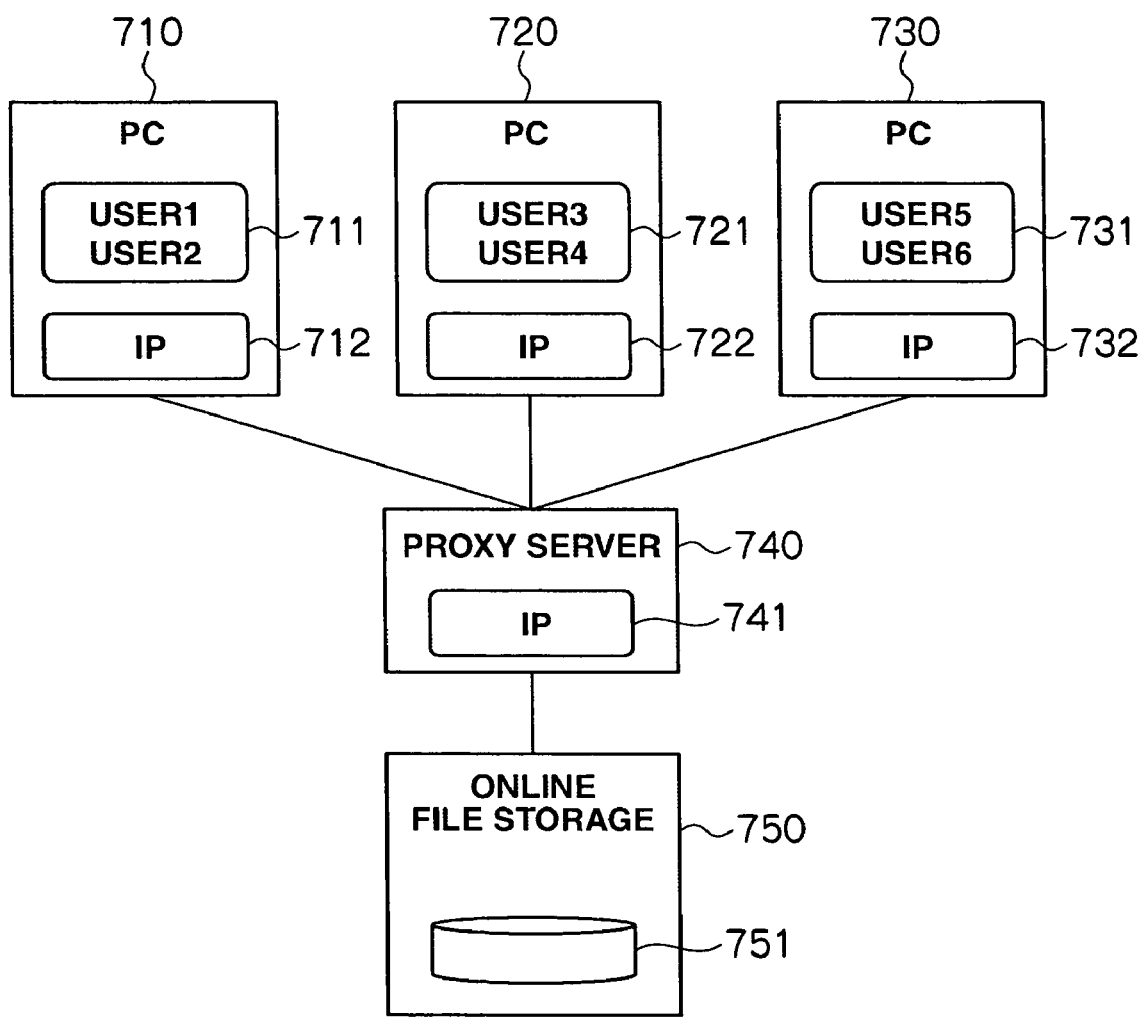
FIG. 37 is a diagram schematically showing the configuration of a system according to the third embodiment of the present invention.

FIG. 37 is a diagram schematically showing the configuration of a privacy protection file sharing system 3 in the third embodiment. The privacy protection file sharing system 3 is configured such that a plurality of PCs 710, 720, 730 are connected to the online file storage 750 via the proxy server 740. Each PC 710, 720, 730 has a unique IP address 712, 722, 732. The proxy server 740 also has a unique IP address 741.

When the personal file management system (not shown) contained in each PC 710, 720, 730 issues a request to create a file in the online file storage 750, as a result of the proxy server 740 replacing the IP address of the source PC with the IP address of the proxy server, the online file storage 750 will recognize a request from any one of the plurality of PCs 710, 720, 730 to be a request from the proxy server 740.

According to the third embodiment, since the online file storage 750 will recognize the requests concerning the online file storage 750 from a plurality of PCs 710, 720, 730 to all be requests from all proxy server 740, anonymity of the IP address of the respective PCs 710, 720, 730 can be protected even further.

Other Embodiments

Although the foregoing first embodiment explained a case where the present invention is a file sharing system 1 including a PC 100, a portable terminal 200, and online file storages 300, 400 connected to the PC 100 and the portable terminal 200 via the Internet, and for storing files from at least the PC 100 or the portable terminal 200 into the online file storages 300, 400 and sharing the stored files with the PC 100 and the portable terminal 200, wherein the PC 100 separates, when creating a file in the online file storage 300, privacy information that identifies a user creating the file from information required for creating the file in the online file storage 300, and creating the file in the online file storage 300 by using information obtained by converting the separated privacy information (S203), the present invention is not limited to the foregoing configuration. Since information capable of identifying individuals can be separated from the online file storage 300, the anonymity of users on the Internet 10 can be ensured.

Further, although the foregoing first embodiment explained a case where the present invention is a file sharing system 1 including a PC 100, a portable terminal 200, and online file storages 300, 400 connected to the PC 100 and the portable terminal 200 via the Internet, and for storing files from at least the PC 100 or the portable terminal 200 into the online file storages 300, 400 and sharing the stored files with the PC 100 and the portable terminal 200, wherein the PC 100 comprises a file management table 180 for at least managing privacy information containing a personal account name and a personal path that identify a user creating a file, and storage management information containing a storage account name that is different from the personal account and a storage path name is different from the personal path name, a registration unit (S305) for creating the storage account name and the storage path name from the personal account name and the personal path name upon creating a new file in the online file storage 300, and associating and registering the personal account name and the personal path name in the file management table 180, and a file creation unit (S306) for creating the new file in the online file storage 300 by using the storage account name and the storage path name registered in the file management table 180, the present invention is not limited to the foregoing configuration. Since information capable of identifying individuals can be separated from the online file storage 300, the anonymity of users on the Internet 10 can be ensured.

Although the privacy information in the foregoing first embodiment includes personal account name, personal path name, group to which the personal account name belongs, type of file, access authority of the file, and time that the information processing unit accessed the online file storage 300, and such information are managed by the file management table 180, the present invention is not limited to this case of managing the privacy information with the file management table 180.

Although the foregoing first embodiment explains a case where the PC 100 comprises an encryption unit (S302) for encrypting a new file, and the file creation unit (S306) creates the new file encrypted with the encryption unit in the online file storage 300, and the file management table 180 manages an encryption key that associates the personal account name and the personal path name and decrypts the encrypted new file, the present invention is not limited to the foregoing configuration. As a result of using an encryption key as described above, it is possible to allow only the personal file management system 120 managing the encryption key to refer to data.

Although the foregoing first embodiment explains a case where the file creation unit (S306) of the PC 100, upon creating a first new file, creates the first new file encrypted with the encryption unit by using a first encryption key in the online file storage 300 by using the storage account name, and the file creation unit of the portable terminal 200, upon creating a second new file, creates the second new file encrypted with the encryption unit by using a second encryption key in the online file storage 300 by using the storage account name, the present invention is not limited to the foregoing configuration. Even though the same account is used as described above, by using different encryption keys, the correspondence relationship of the file group stored in the online file storage and the owner can be anonymized.

Although the foregoing first embodiment explains a case where the registration unit (S305), upon creating the storage account name from the personal account name, allocates the storage account name which is different per file to a file group created by using the personal account name, and the file creation unit (S306) creates the respective files in the online file storage 300 by using the storage account name which is different per file, the present invention is not limited to the foregoing configuration.

Although the foregoing first embodiment explains a case where the registration unit (S305), upon creating the new file, selects a storage account name with the fewest files from the storage account name which is different per file, and the file creation unit (S306) creates the file in the online file storage 300 by using the selected storage account name, the present invention is not limited to the foregoing configuration. As a result of selecting the storage account name with the fewest files as described above, anonymity can be further increased since the number of files can be averaged.

Although the foregoing first embodiment explains a case where the PC 100 comprises an access authority determination unit (S402) for referring to the file management table 180 and determining, upon receiving a read request of a file designated by using the personal account name and the personal path name, whether there is access authority of the read requested file, and a read processor (S405) for referring to the file management table 180, issuing a read request to the online file storage 300 by using a storage account name and a storage path name associated with the read requested file, and reading the read requested file sent from the online file storage 300 based on the request of the read request unit, the present invention is not limited to the foregoing configuration.

Although the foregoing first embodiment explains a case where the PC 100 comprises an access authority determination unit (S502) for referring to the file management table 180 and determining, upon receiving a write request of a file designated by using the personal account name and the personal path name, whether there is access authority of the write requested file, and an update processor (S505) for referring to the file management table 180, issuing a write request to the online file storage 300 by using a storage account name and a storage path name associated with the write requested file, and updating the write result of the write requested file from the online file storage 300 based on the write request, the present invention is not limited to the foregoing configuration.

Although the foregoing first embodiment explained a case where the file management table 180 further manages time information per registered file, and the PC 100 further includes an access unit (S1001 to S1003) that does not update time information in the file management table 180 of files decided randomly from the management table and accesses the randomly decided files in the online file storage 300 at a randomly decided time, the present invention is not limited to the foregoing configuration. As a result of updating only the time information in the online file storage 300 as described above, the anonymity of access history information of the user can be ensured.

Although the foregoing first embodiment explained a case where the PC 100 comprises a dummy file creation unit (S1004 to S1007) for creating a new file containing random contents in the online file storage 300, the present invention is not limited to the foregoing configuration. As a result of creating this kind of dummy file as described above, even when a third party refers to the online storage file, it will be difficult to discover a file capable of identifying personal information.

Although the foregoing first embodiment explained a case where the online file storage 300 comprises a storage account management table 320 for managing a password associated with the storage account name, and the PC 100 comprises a password change unit (S1008 to S1011) for periodically changing the password associated with the storage account name in the online file storage 300, the present invention is not limited to the foregoing configuration. As a result of changing the password as described above, leakage of the password can be prevented.

Although the foregoing first embodiment explained a case where the PC 100 comprises a shared processor (S701 to S707) for performing file sharing processing for sharing a file designated with the personal account name and the personal path name to the online file storage 300 in which the file was created, a read unit (S708) for reading the file using the storage account name and the storage path name of the file from the online file storage 300 based on processing of the shared processor, and a storage unit (S711) for creating a new account and a new path respectively associated with the storage account name and the storage path name, and storing the read file and the new account and the new path in an online file storage 400 that is different from the online file storage 300, the present invention is not limited to the foregoing configuration. As a result of sharing the files as described above, for instance, the personal file management system P1 and the personal file management system P2 will be able to share files while maintaining anonymity.

Although the foregoing first embodiment explained a case where the PC 100 comprises a file deletion unit (S206) for deleting the file designated with the new account and the new path from the different online file storage 400, the present invention is not limited to the foregoing configuration.

Although the foregoing first embodiment explained a case where, upon requesting the sharing of a file, the storage unit (S711) adds explanatory information of the file by associating the explanatory information with the file designated with the new account and the new path, and the present invention is not limited to the foregoing configuration. As a result of adding explanatory information as described above, the user will be able to find the necessary file by searching for the explanatory information.

Although the foregoing first embodiment explained a case where an portable terminal 200 that is able to access the different online file storage 400 includes a search request unit (S802) for accepting input of a keyword to be used in the search together with privacy information containing an account for specifying a user searching a file, accessing the different online file storage 400 by using an account corresponding to the account for identifying the user, and issuing a request for searching explanatory information D1 in the different online file storage 400 by using the keyword, and a search result reception unit (S803) for receiving, as a search result, explanatory information searched based on the request from the search request unit and a path of the file associated with the explanatory information, the present invention is not limited to the foregoing configuration. As a result of presenting the path of the file as described above, a third party will be able to search for a sharable file group.

Although the foregoing second embodiment explained a case where the privacy protection file sharing system 2 comprises online file storages 630, 640, 650 and, upon creating the new file, the file creation unit (S306) includes processing of partitioning the new file to be created into prescribed subfiles (files L, M, N), determining the storage path name per partitioned subfile, and partitioning and creating the file in the plurality of online file storages 630, 640, 650 by using the storage path name per the subfile, and the file management table 180 manages the correspondence relationship of a storage path name determined per the subfile (file L, M, N) and the online file storage 300 in which the subfile was created (subfile configuration information column 185), the present invention is not limited to the foregoing configuration. As a result of partitioning a file into a plurality of subfiles as described above, it is possible to prevent the leakage of all information even if one subfile is leaked.

Although the foregoing third embodiment explained a case where the privacy protection file sharing system 3 comprises a proxy server 740 disposed between PCs 710, 720, 730 and the online file storage 750 for converting an address on the Internet, and the PCs 710, 720, 730 access the online file storage 750 via the proxy server 740, the present invention is not limited to the foregoing configuration. As a result of converting the IP address with the proxy server 740, the IP address of the PCs 710, 720, 730 can be anonymized.

The present invention can be broadly applied to privacy protection file sharing systems and privacy protection file sharing methods.

What is claimed is:

1. A file sharing system including at least one or more information processing units and at least two or more storage apparatuses connected to said at least one or more information processing units via the Internet, and for storing files from said at least one or more information processing units in said storage apparatus and sharing said stored files with said at least one or more information processing units, said information processing unit comprising:
   a management table for at least managing privacy information containing a first account and a first path that identify a user creating a file;
   a registration unit for:
      creating a second account and a second path from said first account and said first path upon creating a new file in said storage apparatus, said second account being different from said first account and said second path being different from said first path; and
      associating and registering said first account and said first path in said management table;
   said management table further including storage management information containing said second account and said second path;
   a file creation unit for creating said new file in said storage apparatus by using said second account and said second path registered in said management table:
   a shared processor for performing file sharing processing for sharing a file designated with said first account and said first path to said storage apparatus in which said file was created;
   a read unit for reading said file using said second account and said second path of said file from said storage apparatus based on processing of said shared processor; and
   a storage unit for creating a third account and a third path respectively associated with said second account and said second path, and storing said read file, said third account, and said third path in a storage apparatus that is different from said storage apparatus;
   wherein, upon requesting the sharing of a file, said storage unit adds explanatory information of said file by associating said explanatory information with the file designated with said third account and said third path.

2. The file sharing system according to claim 1,
   wherein said privacy information further includes at least any one of the following pieces of information among the group to which said first account belongs, type of file, access authority of the file, and time that said information processing unit accessed said storage apparatus; and
   wherein said management table manages at least any one of the following pieces of information among the group to which said first account belongs, type of file, access authority of the file, and time that said information processing unit accessed said storage apparatus further included in said privacy information by associating said information with said first account and said first path.

3. The file sharing system according to claim 2,
   wherein said information processing unit includes:
   an access authority determination unit for referring to said management table and determining, upon receiving a read request of a file designated by using said first account and said first path, whether there is access authority of said read requested file; and
   a read processor for referring to said management table, issuing a read request to said storage apparatus by using a second account and a second path associated with said read requested file, and reading said read requested file when said access authority determination unit determines that there is access authority.

4. The file sharing system according to claim 2,
   wherein said information processing unit includes:
   an access authority determination unit for referring to said management table and determining, upon receiving a write request of a file designated by using said first account and said first path, whether there is access authority of said write requested file; and
   an update processor for referring to said management table, issuing a write request to said storage apparatus by using a second account and a second path associated with said write requested file, and updating the write result of said write request when said access authority determination unit determines that there is access authority.

5. The file sharing system according to claim 1,
   wherein said information processing unit further comprises an encryption unit for encrypting said new file;
   wherein said file creation unit creates the new file encrypted with said encryption unit in said storage apparatus; and
   wherein said management table associates said first account and said first path, and manages an encryption key for decrypting said encrypted new file.

6. The file sharing system according to claim 5,
   wherein a file creation unit of a first information processing unit among said at least one or more information processing units, upon creating a first new file, creates said first new file encrypted with said encryption unit by using a first encryption key in said storage apparatus by using said second account; and
   wherein a file creation unit of a second information processing unit among said at least one or more information processing units, upon creating a second new file, creates said second new file encrypted with said encryption unit by using a second encryption key in said storage apparatus by using said second account.

7. The file sharing system according to claim 1,
   wherein said registration unit, upon creating said second account from said first account, allocates said second account which is different per file to a file group created by using said first account; and
   wherein said file creation unit creates the respective files in said storage apparatus by using said second account which is different per file.

8. The file sharing system according to claim 7,
   wherein said registration unit, upon creating said new file, selects a second account with the fewest files from said second account which is different per file; and
   wherein said file creation unit creates the file in said storage apparatus by using said selected second account.

9. The file sharing system according to claim 1,
   wherein said management table further manages time information per registered file; and
   wherein said information processing unit further includes:
   an access unit that does not update time information in said management table of files decided randomly from said management table and accesses said randomly decided files in said storage apparatus at a randomly decided time.

10. The file sharing system according to claim 1,
    wherein said information processing unit includes:
    a dummy file creation unit for creating a new file containing random contents in said storage apparatus.

11. The file sharing system according to claim 1,
wherein said storage apparatus includes:
an account management table for managing a password associated with said second account; and
wherein said information processing unit includes:
a password change unit for periodically changing the password associated with said second account in said storage apparatus.

12. The file sharing system according to claim 1,
wherein said information processing unit includes:
a file deletion unit for deleting the file designated with said third account and said third path from said different storage apparatus.

13. The file sharing system according to claim 1,
wherein an information processing unit that is able to access said different storage apparatus includes:
a search request unit for accepting input of search information to be used in the search together with privacy information containing a fourth account for specifying a user searching a file, accessing said different storage apparatus by using a fifth account corresponding to said fourth account, and issuing a request for searching explanatory information in said different storage apparatus by using said search information; and
a search result reception unit for receiving, as a search result, explanatory information searched based on the request from said search request unit and a path of the file associated with said explanatory information.

14. The file sharing system according to claim 1 comprising a plurality of said storage apparatuses,
wherein, upon creating said new file, said file creation unit includes processing of partitioning said new file to be created into prescribed subfiles, determining said second path per partitioned subfile, and partitioning and creating said file in said plurality of storage apparatuses by using said second path per said subfile; and
wherein said management table manages the correspondence relationship of a second path determined per said subfile and the storage apparatus in which said subfile was created.

15. The file sharing system according to claim 1, further comprising:
a server disposed between said at least one or more information processing units and said storage apparatus for converting an address on said Internet;
wherein said information processing unit accesses said storage apparatus via said server.

* * * * *